Nov. 21, 1944.  D. N. CROSTHWAIT, JR., ET AL  2,362,977
RESISTANCE TYPE TEMPERATURE CONTROLLING AND INDICATING SYSTEM
Filed Oct. 24, 1938  7 Sheets-Sheet 1

Inventors.
David N. Crosthwait Jr.
and Everett W. Werts
by Barnett & Truman
Attorneys.

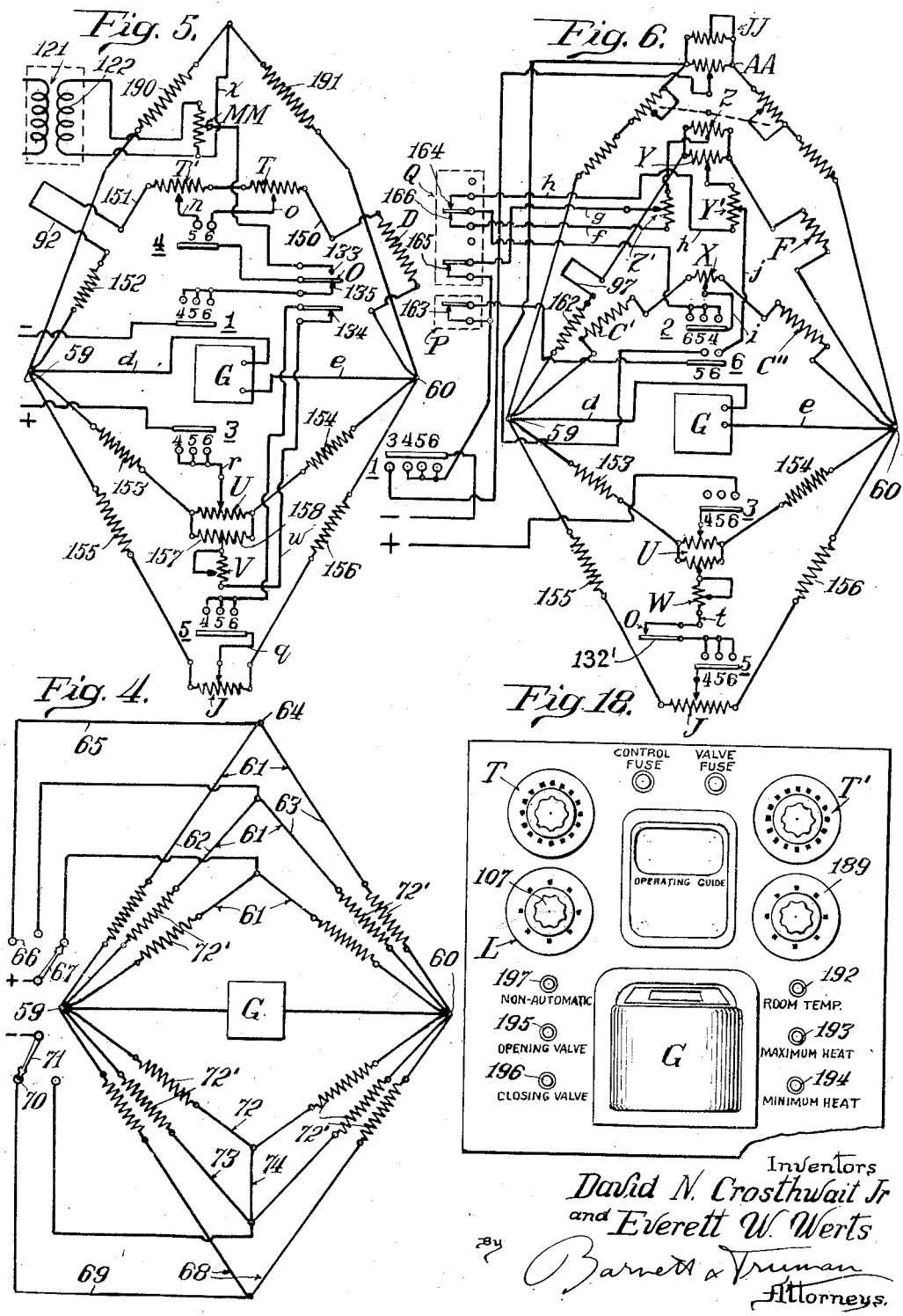

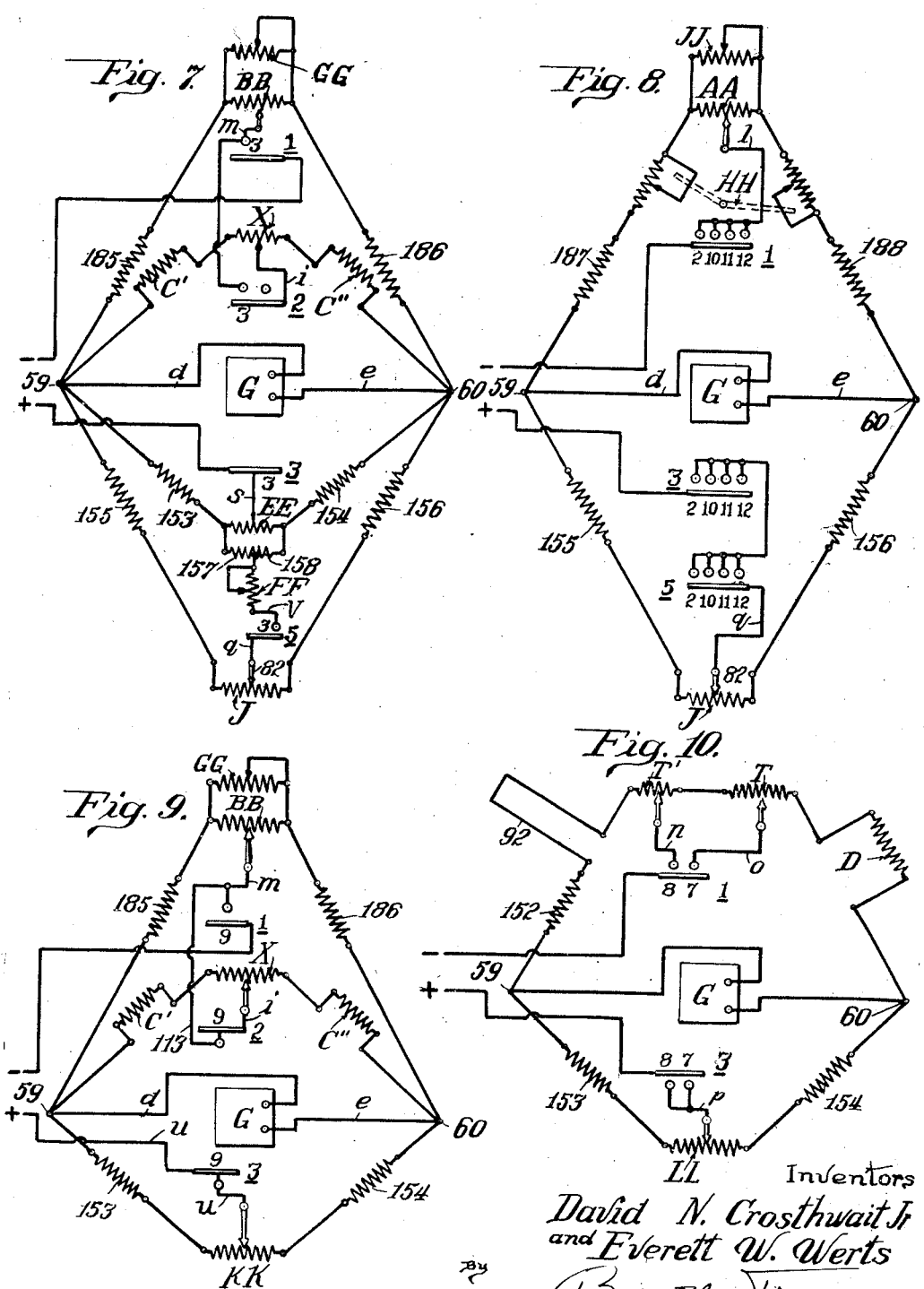

Nov. 21, 1944.  D. N. CROSTHWAIT, JR., ET AL  2,362,977
RESISTANCE TYPE TEMPERATURE CONTROLLING AND INDICATING SYSTEM
Filed Oct. 24, 1938  7 Sheets-Sheet 7
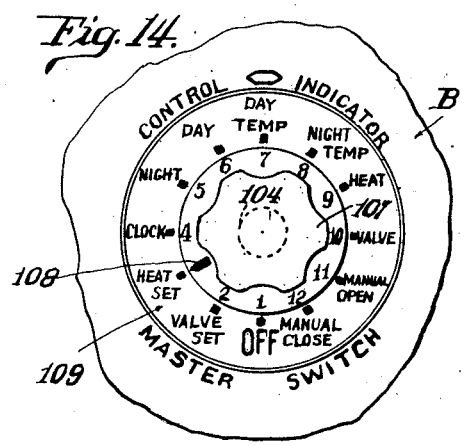
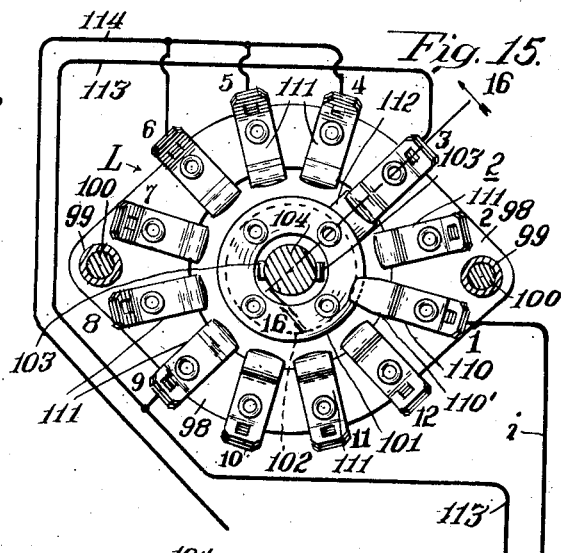
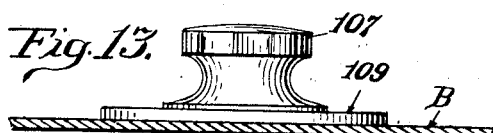
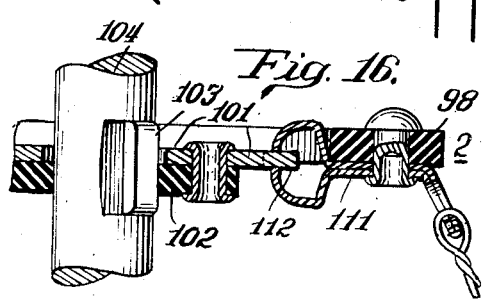
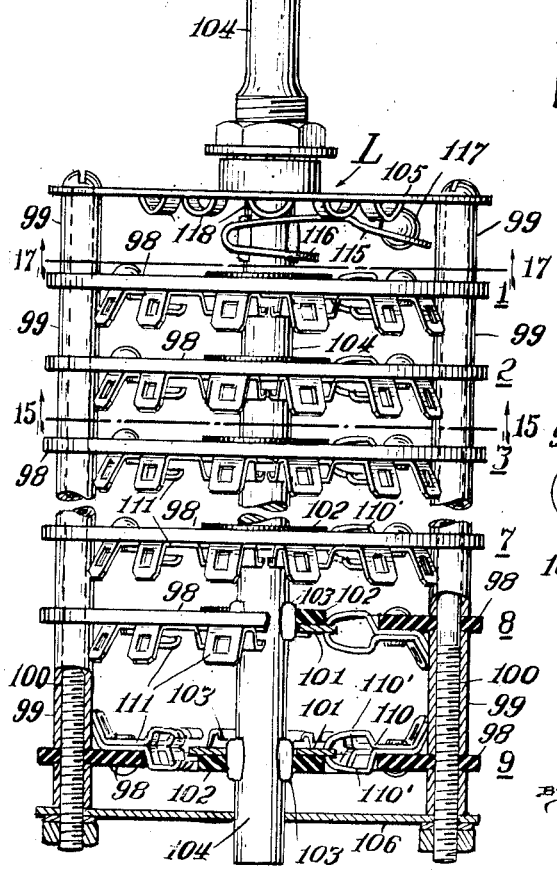
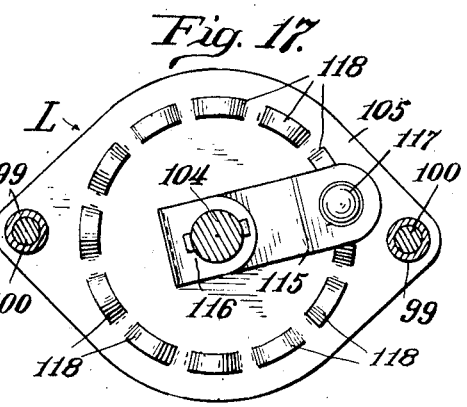
Inventors.
David N. Crosthwait Jr.
and Everett W. Werts
By
Attorneys.

Patented Nov. 21, 1944

2,362,977

UNITED STATES PATENT OFFICE

2,362,977

RESISTANCE TYPE TEMPERATURE CONTROLLING AND INDICATING SYSTEM

David N. Crosthwait, Jr., Chicago, Ill., and Everett W. Werts, Michigan City, Ind., assignors to C. A. Dunham Company, Marshalltown, Iowa, a corporation of Iowa Application October 24, 1938, Serial No. 236,824

41 Claims. (Cl. 236—91)

The invention relates to certain new and useful improvements in a resistance type temperature controlling and indicating system, and more particularly to a system which from a single control point remote from many of the elements which effect the control or are to be controlled, modulates the flow of steam or other heating medium to a heating system in accordance with existing temperature conditions both inside and outside of the heated space, and also permits indications to be obtained at this central point of the prevailing temperatures, rate of heat output, and setting of the valve or other controlled apparatus. The particular mechanism hereinafter described by way of example adjusts a central control valve for modulating or proportioning the flow of steam to a steam heating system, but the control mechanism could be adapted for the adjustment of automatic combustion devices, or other apparatus for regulating the heat supply.

This improved control system is based upon the principle of the variation in the resistance of a metallic conductor in response to temperature changes. This principle is applied by the use of temperature sensitive resistance windings in Wheatstone bridge circuits to operate a sensitive galvanometer relay, which in turn controls the setting of a motorized valve. The Wheatstone bridge comprises a multiplicity of arms which may be alternatively and selectively grouped in the bridge so as to affect a plurality of different controls or indications. The galvanometer of the relay is sometimes utilized as a null point indicator. There are no moving parts in the thermally responsive elements which are all in the form of substantially fixed resistance windings.

The rate of steam supply is regulated in steps, with a small pause after each step permitting the corresponding change in the rate of steam supply to take effect, and after the valve opening has been corrected by an amount proportional to the temperature deviation from the predetermined level, the control stands by until such time as the need for another correction is detected.

By means of a temperature sensitive resistance winding mounted on the inside surface of a pane of window glass, the controller reacts to the inner surface temperature of the glass as a measure of the heat requirements of the building as determined by prevailing outdoor weather conditions, also inside air temperature and mean radiant temperature of interior parts of the building. By means of a pair of temperature sensitive resistance windings, one mounted below and the other above the heating element in a convector type of heating unit, the controller reacts to the rise in temperature of the air stream passing through this heating element as a measure of the rate of heat output from the heating system. By means of a temperature sensitive resistance winding, or a plurality of these windings located at different positions in the heated space within the building, the controller reacts to the inside or room air temperature. By means of a mechanically operated resistance potentiometer adjusted by the motor which operates the control valve so that the potentiometer is in synchronism with the valve, the controller reacts to the degree of opening of the control valve. By means of combinations of these primary sensitive control elements in the bridge circuits, selected in suitable step by step rotation to operate the galvanometer relay, the controller is capable of performing the following automatic control functions:

1. Automatic step by step modulating or proportioning control of the steam valve in response to temperature changes inside the heated space, as determined by the setting of a manually operated resistance potentiometer, but with the control from within the space dominated by the control from the window and radiator thermostats in a manner to maintain the rate of heat output from the heating system above a minimum rate and below a maximum rate established and independently varied in relation to the prevailing outdoor weather conditions, and independently adjusted in accordance with the requirements of the particular building in which the heating system is installed. The temperature thus maintained is adjusted in accordance with either day or night requirements, and if desired this adjustment is affected automatically by means of a clock.

2. Automatic step by step modulating control of the steam valve in response to temperature changes of the radiator thermostats to maintain a selected rate of heat output from the system as determined by the setting of a manually operated potentiometer.

3. Automatic step by step positioning of the steam control valve to any desired degree of opening as determined by the setting of a manually operated potentiometer.

In addition to the above noted alternative automatic controls the valve can be manually adjusted, and also rapidly opened or closed at any time from the central control point.

By the use of the galvanometer relay as a null point indicator in selected bridge circuits incorporating the different primary sensitive elements, the following indications may be obtained at the central control point:

1. An indication of the inside or room air temperature then prevailing.
2. An indication of the prevailing rate of heat output from the system.
3. An indication of the established degree of opening of the control valve.

The principal object of this invention is to provide an improved controlling and indicating system of the type briefly described hereinabove and disclosed more in detail in the specifications which follow.

Another object is to provide an improved heat-balancer or radiator thermostatic mechanism for measuring and indicating the rate of heat output of the system.

Another object is to provide an improved thermostatic mechanism for measuring the heating requirements within the building as a function of prevailing outside weather conditions.

Another object is to provide improved means for automatically compensating for or balancing the resistance and heat response of the conductors leading to the various remotely positioned heat-sensitive resistances.

Another object is to provide improved means for automatically affecting a step by step control of the valve, and simultaneously maintaining the heat output within a temperature range determined by outside temperature conditions.

Another object is to provide means for automatically positioning the valve in the event that an excess steam pressure is developed.

Another object is to provide means for automatically re-balancing certain of the bridge circuits as the valve opening is adjusted.

Another object is to provide means operable from the control panel, and readable at the panel, for utilizing portions of the bridge mechanism to indicate the prevailing temperature, rate of heat output, or valve openings.

Another object is to provide means operable from the control panel for manually setting the valve opening.

Another object is to provide means operable from the control panel for interchangeably selecting various combinations of bridge circuits to effect a variety of manual and automatic controls and indications.

Another object is to provide various adjustments in the control panel for establishing the temperature range, and the sensitivity and rate of response of the temperature controlling elements of the system.

Other objects and advantages of this invention will be more apparent from the following detailed description of one approved system constructed and operating according to the principles of this invention.

In the accompanying drawings:

Fig. 1 is a diagrammatic layout of a heating system with the improved control and indicating system applied thereto.

Figs. 2 and 3 constitute together a complete wiring diagram of the control system, Fig. 3 being a continuation of the right-hand side of Fig. 2. The circuit wires extending from the right-hand side of Fig. 2 and entering at the left-hand side of Fig. 3 are designated successively by the characters $a$ to $z'$ respectively so as to facilitate the reading of these two figures in connection with one another.

Fig. 4 is a schematic diagram illustrating the general principle of the Wheatstone bridge circuits.

Fig. 5 is a wiring diagram of the room temperature control bridge.

Fig. 6 is a diagram of the maximum and minimum heat control bridges.

Fig. 7 is a diagram of the heat-output setting control bridge.

Fig. 8 is a diagram of the valve-opening setting and indicating bridge circuits.

Fig. 9 is a diagram of the heat output indication bridge.

Fig. 10 is a diagram of the room-temperature indication bridge.

Fig. 13 is an elevation, partially broken away, showing the main control switch.

Fig. 14 is a plan view of the operating knob and dial of the main control switch, as seen looking downwardly on the assembly of Fig. 13.

Fig. 15 is a horizontal section, looking upwardly, and taken substantially on the line 15—15 of Fig. 13.

Fig. 16 is a detail vertical section, taken substantially on the line 16—16 of Fig. 15.

Fig. 17 is a horizontal section showing the locking mechanism, the view being taken looking upwardly along the line 17—17 of Fig. 13.

Fig. 18 is a front view of the control panel.

Figure 1:
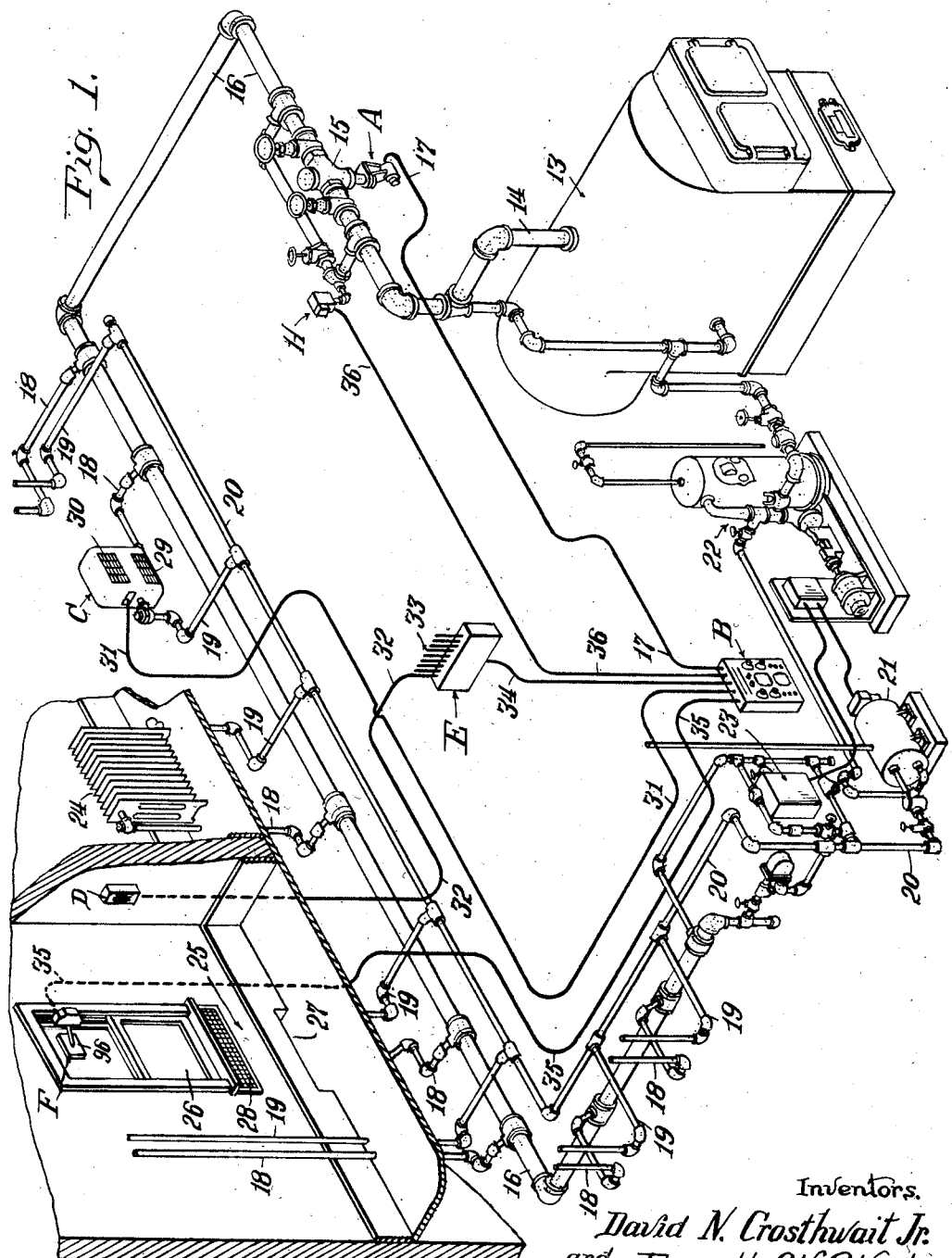

Attention is first directed to Fig. 1 which illustrates the application of this improved control system to a heating system of the general type disclosed in the patent to Dunham 1,644,114, granted October 4, 1927. This particular form of heating system is merely shown by way of example, and it will be understood that the improved control mechanism which forms the subject matter of this invention is applicable to other types of heating systems. At 13 is indicated the boiler or generator which supplies steam at sufficiently high pressure through main 14 to the control or reducing valve 15. The motor assembly indicated generally at A automatically modulates the position of valve 15 so as to establish a controlled flow of steam at reduced pressure through the supply main 16. The conduit wires for motor mechanism A extend through cable 17 to the main control panel indicated at B. Steam flows from supply main 16 through risers 18 to the several individual radiators of the heating system, these radiators being provided with outlet traps through which condensate and air are drawn out through pipes 19 into the return main 20 leading back to the accumulator tank 21. The exhauster mechanism indicated generally at 22, and controlled by the differential pressure-controller 23 functions to help maintain the desired vacuum in the radiators and return, to withdraw and vent the air or non-condensable gases, and to return condensate to the generator 13. As examples of the types of radiation that may be used, at 24 is indicated an ordinary room radiator, whereas at 25 is located a concealed radiator positioned beneath window 26, air flowing in from the room through opening 27 thence upwardly in contact with the radiator and the heated air flowing out through grille 28.

At C is indicated the "heat-balancer" or device for measuring the heat output from the system, this device as here shown being in the form of a small radiating unit enclosed in a casing through which air flows in at grille 29 and out through grille 30. The thermostatic elements positioned in this heat balancer are connected by conductors extending through cable 31 to control panel B. The construction and operation of this heat-balancer will be referred to in detail hereinafter.

At D is indicated one of the room thermostats which is connected by cable 32 with the terminal box E. Additional inside or room thermostats similar to D (for example as indicated at D' Fig. 3) are similarly connected to terminal box E by individual cables as grouped at 33 (Fig. 1). A cable 34 extends from terminal box E to control panel B.

The window-selector F which is responsive to changes in outside temperature and will be referred to more in detail hereinafter, is connected through cable 35 with control panel B.

At H is indicated a maximum steam-pressure control switch, responsive to the steam pressure in main 14, and connected to control panel B through cable 36.

Figure 2:
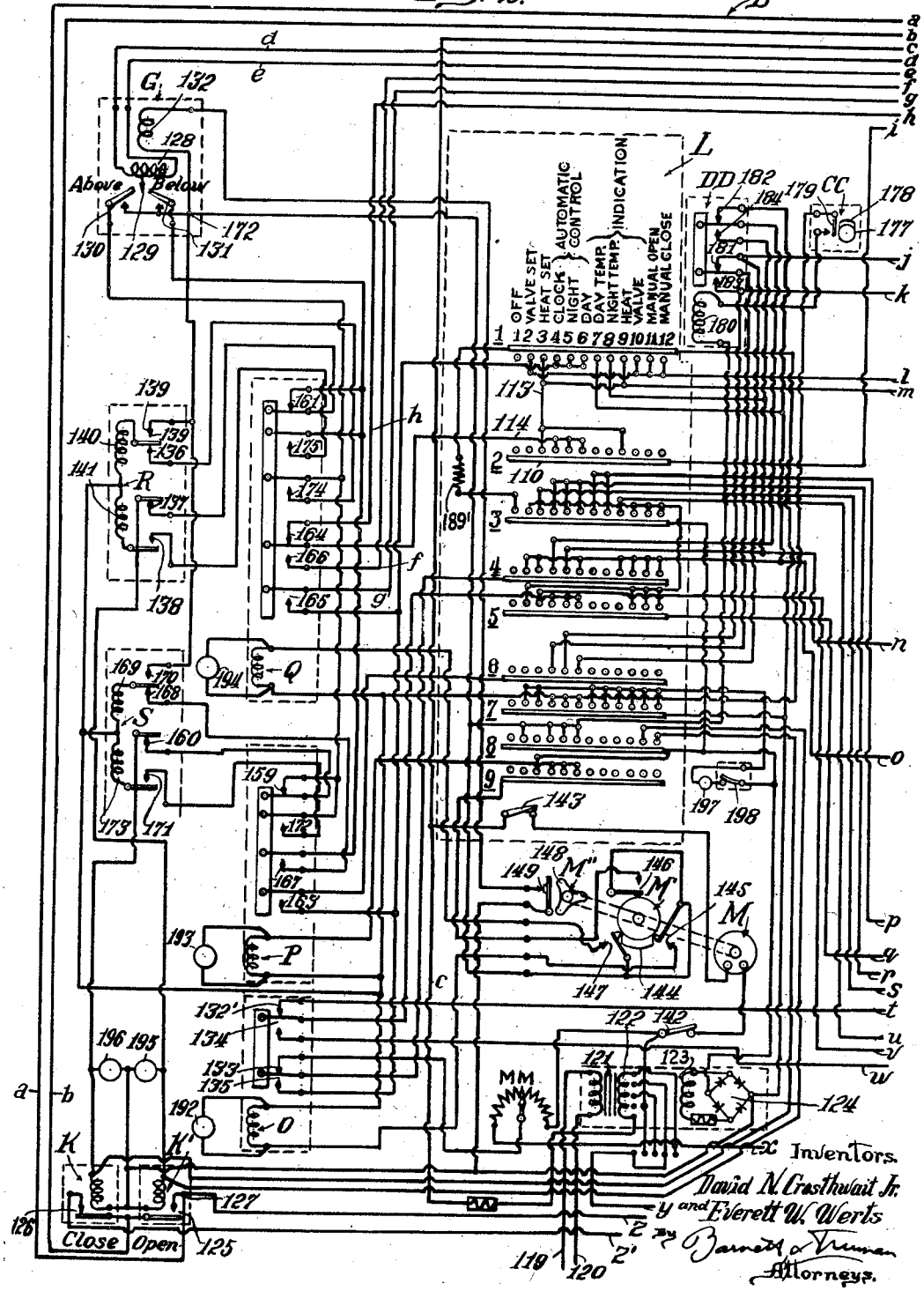
Figure 3:
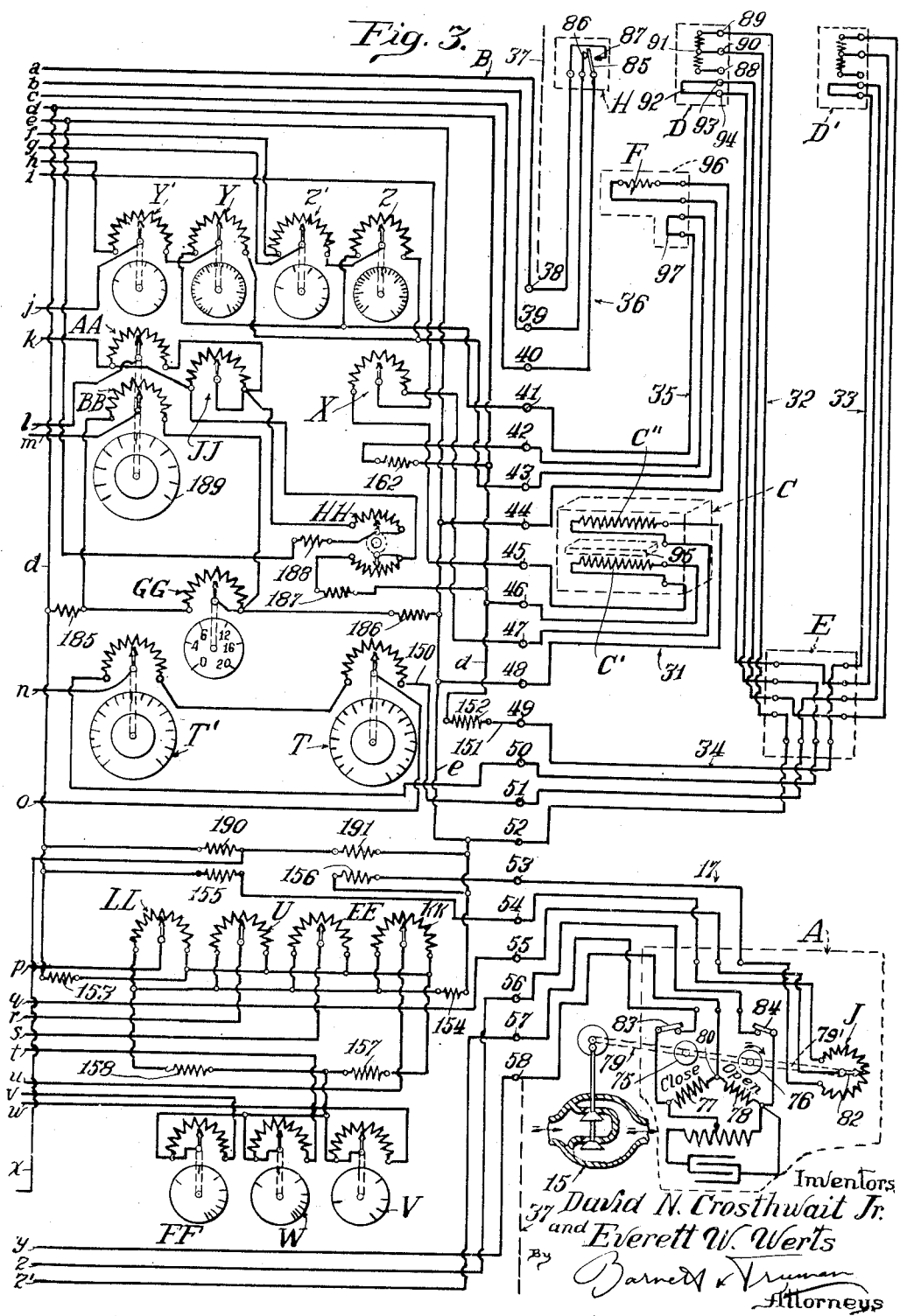

Referring now for the moment to Figs. 2 and 3, all of the mechanism shown in Fig. 2, and all of the mechanism at the left of Fig. 3 as far as the dash line 37 is located in or on the control panel B. The several control devices A, C, D, E, F, and H are indicated to the right of line 37 in Fig. 3 and are connected through the cables shown in Fig. 1 (shown as individual wires in Fig. 3) with the series of coded terminal posts 38 to 58 inclusive on control panel B.

Before describing the actual elements of this control system in detail, brief reference will be made to the schematic wiring diagram shown in Fig. 4 in order to explain the general principle on which this system operates. The Wheatstone bridge shown in Fig. 4 comprises a galvanometer relay G connected across the opposite terminals 59 and 60 of the bridge. The upper half of the bridge comprises three similar alternative branches 61, each comprising a pair of arms 62 and 63 joined at terminal 64 which is connected through wire 65 with one contact 66 of a switch comprising the movable selecting arm 67. The positive lead of the current supply circuit is connected to arm 67. The other side of the bridge comprises a branch 68 similar in all respects to one of the branches 61 already described, this branch being connected through wire 69 to a contact 70 of a second switch 71 with which the negative power lead connects. A pair of branches 72 and 73 of the bridge are connected by a wire 74 leading to another contact of switch 71. In this manner the branches 72 and 73 are connected in parallel in one side of the bridge. It will be apparent that by proper manipulation of the switches 67 and 71 a great many different combinations of branches may be alternatively connected in the bridge system so that it may function as a plurality of alternative control bridges each utilizing the same galvanometer relay G. In each arm of the various branches of the bridge are positioned resistances 72'. Each of these resistances 72' may consist of a plurality of resistances connected either in series or in parallel. Some of these are in the form of fixed resistances; some are in the form of adjustable potentiometers or rheostats; and some are in the form of resistance coils that are highly sensitive to temperature changes, that is the resistance varies in response to small changes in the temperature of the medium to which they are exposed. The resistances of this latter group are not positioned directly within the control panel but are embodied in the temperature responsive devices D, C and F hereinabove referred to and described more in detail hereinafter. With the bridge in an initial state of balance, a variation in the resistance of the temperature-responsive resistances will unbalance the bridge and create a difference in potential between the terminals 59 and 60 so that the needle of the sensitive galvanometer G will be deflected in one direction or the other, and through its cooperating relay (hereinafter described) will, through the motor mechanism A, effect an adjustment of the valve 15 and thus control the heat output of the heating system.

In the illustrative bridge system shown in Fig. 4, and in the bridges actually used as disclosed hereinafter, the galvanometer is fixedly connected across two terminals 59 and 60 of the bridge. Alternatively, the power supply could be directly connected across terminals 59 and 60 and the galvanometer could be alternatively connected with different branches of the bridge system. However, the first form as herein disclosed is preferred, since all separable contacts are eliminated from the galvanometer circuit. Since the galvanometer is an extremely sensitive device and responds to very small current changes, it is desirable not to have any relatively movable contacts in the galvanometer circuit. As already noted, the simplified bridge system shown in Fig. 4 is merely used to illustrate the general principle of operation of this system, whereas the various bridge circuits actually used are shown separately in Figs. 5 to 10 inclusive, and are also embodied in the main wiring diagram shown in Figs. 2 and 3.

Before proceeding further with the description of the apparatus, brief reference will be made to the chart shown in Fig. 11. In this chart the rate of heat output in percent of the heating capacity of the system is indicated by the horizontal lines, and the outdoor temperature is indicated by the vertical lines. In order to prevent "over-shooting," or "under-shooting," or other undue departures from the substantially steady heat output which provides the most balanced and efficient operation of the system, there is, for each outdoor temperature, a certain maximum heat output which should never be exceeded, and a certain minimum below which the heat output should never be permitted to drop. Within the range between this maximum and minimum, the heat output may be adjusted in accordance with deviations from a desired temperature within the enclosure that is being heated. Within the zone between the "maximum heat line" and "minimum heat line" as indicated on the chart, the heat output is controlled by one or more inside thermostats. Cooperating thermostats responding respectively to the outdoor temperature and the rate of heat output prevailing at any given time function to maintain the heat output within the proper control zone. In the actual operation of the present system, the heat output of the radiators is adjusted step-by-step, or intermittently, for example once every minute in response to departures from the desired inside temperature. If the inside temperature is below the desired temperature at some one time the heat output is somewhat increased, for example by giving a slight opening movement to the modulating steam valve. After a certain period of time, for example a minute, during which this adjustment is allowed to take effect, if the heat output is still insufficient the valve is given an additional opening movement, and so on until the necessary adjustment is effected. However, between each adjustment in response to inside temperature readings, additional readings are taken as to the prevailing heat output in relation to the outside temperature. If the maximum heat output for that outside temperature is being exceeded, the valve is slightly closed, and the control mechanism is rendered ineffective to cause any further opening of the valve in response to the inside temperature until the heat output has been brought below the permitted maximum. In the same way, if the heat output has fallen below the required minimum for that outside temperature, the valve is given an opening adjustment, and no closing movement can be imparted to the valve by the inside thermostat until the heat output has again risen above the necessary minimum.

Figure 11:
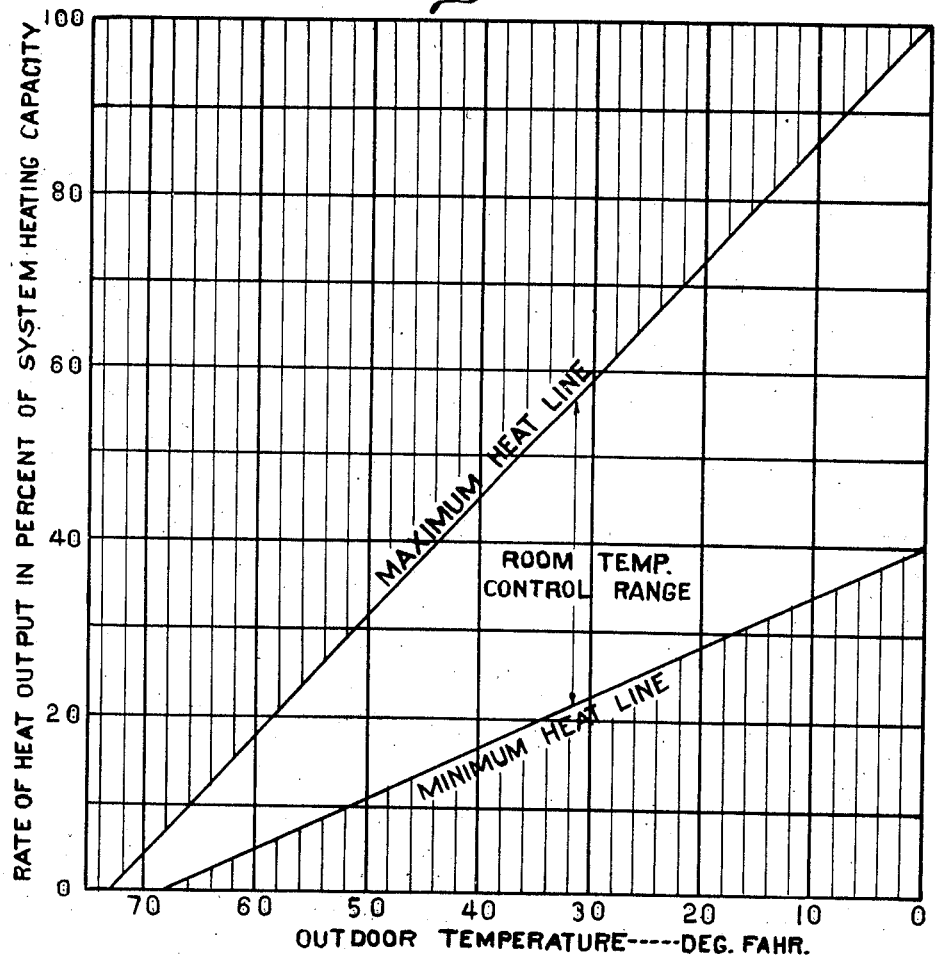
Fig. 11 is a chart indicating the principle of automatic control carried out by this system.

As will be noted from the chart shown in Fig. 11, there will usually be a wider permissible heat output range at lower outdoor temperatures than for higher outdoor temperatures. The actual slope of the maximum and minimum heat lines, as well as the width of the permitted control zone between these lines, and the proper maximum and minimum heat output for any given outdoor temperature, will vary for each building installation, on account of many factors such as the size and shape of the building; the construction of the building, that is the rate of heat loss therefrom; and the weather conditions normally prevailing at this location. For this reason it is necessary that the slope or inclination of the maximum and minimum heat lines, as well as the location of these lines on the chart and the distance between them, must be initially adjusted for any given installation, and many of the potentiometers or rheostats hereinafter described are provided for making these initial adjustments.

Referring now again to Figs. 1 and 3, the several instrumentalities not located in or on the control panel B will first be described. These devices are indicated at the right of the dash-line 37 in Fig. 3.

Valve-operating motor

The motor mechanism indicated at A comprises a pair of oppositely rotating motors 75 and 76 provided with fields 77 and 78 respectively, although a single reversible motor could be substituted if desired. These motors are connected through the reduction gearing indicated diagrammatically at 79 with the modulating valve 15 so that a brief rotation of one or the other of the motors will cause a small adjustment of the valve toward open or closed position. One wire of the motor-actuating circuits extends from the common terminal 80 of the two motors to terminal 58 on panel board B. The other wires of the two motor circuits lead respectively to the panel-board terminals 56 and 57. The bridge re-balancing potentiometer J comprises a movable contact member 82 that is driven at reduced speed from the motor mechanism through the connections indicated diagrammatically at 79'. This potentiometer J is located in certain of the bridge circuits and will be referred to again hereinafter. Circuit wires lead from the two extremities of resistance J and from the movable contact member 82 to the three terminals 53, 54 and 55 of the panel board. All of these wires leading from the motor-assembly A to the panel board are included in the cable indicated at 17 in Fig. 1.

A pair of limit switches 83 and 84 are located in the respective actuating circuits of the two motors 75 and 76 so as to break these respective circuits and stop the motor when the valve has been moved to extreme closed or open position. These limit switches are operated mechanically in well known manner.

The pressure-release switch H is positioned in the motor-actuating circuits (as hereinafter described in connection with the panel board B) and is connected with the panel board through three wires leading to the board terminals 38, 39 and 40, these wires being included in the cable 36 as shown in Fig. 1. This switch H comprises a movable contact 85 which will normally remain in engagement with fixed contact 86 as long as the steam pressure in the generator and main 14 does not exceed a certain maximum. In the event that the generator pressure rises above this maximum, movable contact 85 will engage a second fixed contact 87 so that the valve 15 will be automatically thrown open to let the steam flow freely into the radiating system and thus relieve the pressure in the generator. This of course will disturb the proper automatic control of the heating system until the generator pressure has been again lowered within safe limits. In ordinary operation the switch H will remain in the position shown in Fig. 3, and this control switch can be omitted entirely as far as the proper operation of the temperature control system is concerned.

Inside or room thermostat

Figure 12:
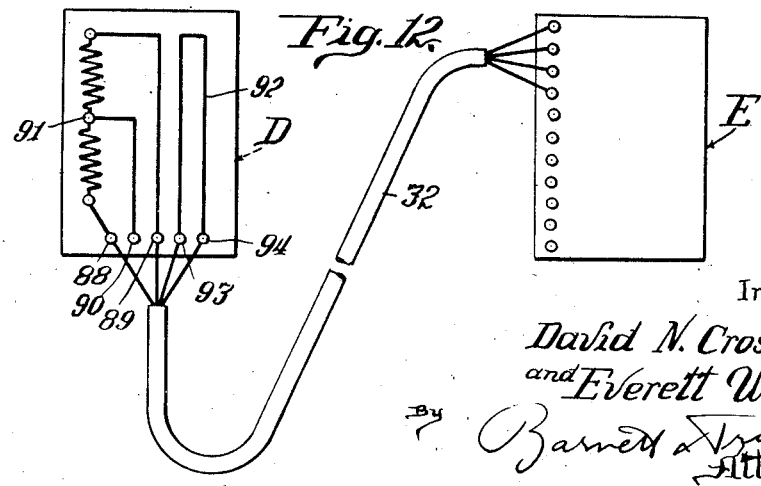
Fig. 12 is a detail view showing one of the room thermostats, and the cable connection used for automatically balancing the bridge arms.

Referring now to Figs. 1, 3 and 12, the inside or room thermostat D comprises a highly heat-sensitive resistance coil connected at its ends to the two coded terminals 88 and 89. A third coded terminal 90 is connected to a mid-point 91 of the resistance. When a single room thermostat D is used (as in Figs. 1 and 12) the outside circuit wires will be connected to the terminals 88 and 89 so that the entire resistance will be included in the circuit. If two similar room thermostats D and D' are used (as in Fig. 3) the outside circuit wires will be connected to terminals 89 and 90 so as to include only half of the resistance in the circuit, the resistances of the two thermostats being connected in series so that the total resistance will be the same as if one thermostat were used. The end portion of a balancing wire loop 92 is contained within the thermostat housing and connected at its ends to another pair of terminals 93 and 94. As will be more apparent hereinafter, the resistance of the thermostat D is connected in one arm of one branch of a bridge circuit, while the balancing loop 92 is connected in the opposite arm of this branch so as to automatically compensate for the resistance of the leads extending from the panel board to the thermostat. The cable 32 (see also Fig. 1) extending from the thermostat D to the terminal box E contains four coded wires which are connected to similarly coded terminals in the thermostat and terminal box respectively. It will be understood that in different installations the distance between the thermostat and the terminal box will vary, but by using a four-wire coded cable the length of the balancing loop 92 will be automatically adjusted in accordance with the circuit loop extending to the heat-sensitive resistance, even though the installing electrician does not clearly understand the functioning of the apparatus.

By means of a similar four-wire coded cable, the terminal box E is connected with the panel board B. The circuit wires leading from the resistance coil of the thermostat extend to terminals 51 and 52 of the panel board. Similarly, the circuit wires of balancing loop 92 extend to the terminals 49 and 50 on the panel board.

It will be noted in Fig. 3 that the terminals within terminal box E are so connected that the two half-resistances of thermostats D and D' are connected in series, whereas the balancing loops 92 are also connected in series. It will be apparent to one skilled in the art that by using either all or one-half of the temperature sensitive resistance in each thermostat, and by appropriately arranging the connections within the terminal box E, either four, nine, or a greater number of thermotats can be used while still keeping the total effective resistance of the several thermostats substantially constant.

The heat-balancer

The heat-balancer C which has already been briefly described in connection with Fig. 1, comprises a pair of equal heat-sensitive resistances C' and C'' which are positioned respectively below and above the radiator or heating element 95 and in the path of the air stream flowing upwardly through the heat-balancer casing from inlet grille 29 to outlet grille 30 (Fig. 1). The resistances C' and C'' are not only of equal resistance value, but are preferably of the same length and similarly positioned within the air stream with relation to different portions of the radiating element 95. Resistance C' is connected in one arm of one branch of a control bridge by means of circuit wires leading from terminals 45 and 46 on the control panel B. The other resistance C'' is connected with terminals 47 and 48 on the control panel so as to position this resistance in the opposite arm of the same bridge branch. Any difference in the temperatures to which the two resistances are subjected will thus cause a resistance change or unbalance in the two arms of the bridge. A heat-balancer of this type is preferable to one utilizing a single thermostat or single temperature responsive resistance. By utilizing the difference in the two resistances C' and C'' as a measure of the heat-output any variation in the temperature of the air entering the heat-balancer is automatically compensated for. Also, in extremely mild weather when the heat-output should be quite small and changes in heat-output are difficult to measure, this resistance-differential method of measuring the heat output is more efficient. Under such conditions, the radiating element 95 may be only partially filled and different portions thereof will have different temperatures. However, the resistance elements C' and C'' are similarly positioned with respect to the air stream so as to compensate for temperature differences at various locations in the radiator. This type of heat-balancer directly measures the temperature change in the air-stream as the result of heat imparted thereto by the radiator, and this is the logical and most effective way of measuring the heat-output.

It will be noted that since the two resistances C' and C'' are connected in opposite arms of a branch of the control bridge, and connected with the control panel by a four-wire coded cable 31 (Fig. 1) the resistances of the leads extending to the heat-balancer are automatically compensated for. Also since different portions of this cable are subjected to the same temperature-change conditions (as is also the case with the cables leading to the room thermostats previously described) any change in resistance of these lead wires due to temperature conditions will be the same for all of the lead wires.

Window-thermostat

The window-thermostat F (Figs. 1 and 3) is adapted to directly measure the effect within the building of outside temperature and weather changes. The heat-sensitive resistance of this thermostat is housed within a casing 96 supported in contact with the inner surface of the glass of an outside window. It is arranged to respond quickly to outside temperature changes as transmitted through the window and less rapidly to inside temperature changes. The heat-sensitive coil is connected to terminals 43 and 44 on the panel board B. A balancing loop 97 is similarly connected to terminals 41 and 42 on the panel board. It will be understood that the heat-sensitive resistance F, and the balancing loop 97 are positioned in opposite arms of a bridge control branch, as will be hereinafter described. The thermostat is connected with the control panel by means of a four-wire coded cable 35 (Fig. 1) so as to automatically adjust the length of the balancing loop, as already described in connection with the other control thermostats.

Means are preferably provided for yieldably holding the window-thermostat F in engagement with the inner surface of the window pane, as well as for automatically moving the thermostat out of engagement with the window as the window is opened or closed. This mechanism is not here shown but is disclosed in detail and claimed in a copending application of the same inventors, Serial No. 236,825 filed of even date herewith. The specific construction of the window-thermostat F is also disclosed in said copending application.

Control panel

Some of the elements of the main control panel B will now be described, beginning with the master control switch L shown in detail in Figs. 13 to 17 inclusive. The wiring of this switch is also indicated in Fig. 2 within the broken line enclosure indicated by the reference character L. This switch is of the so-called "multiple-gang" type already known, although it has been modified and adapted for the present purpose. This switch comprises nine separate but simultaneously operated switches or decks indicated by the reference characters 1 to 9 in Fig. 2. The several decks are all substantially alike, except for the wiring connections, and for this reason a central portion of the switch has been broken away in Fig. 13 only the upper three and the lower three of the decks being shown in this figure. Each of the switches or decks is movable circumferentially to twelve separate positions, including an "off" position and eleven operating positions, as indicated above deck 1 in Fig. 2, and also indicated on the dial shown in Fig. 14.

The fixed contacts of each deck of the switch are mounted on a plate of insulating material 98, the several plates 98 being separated by cylindrical spacers 99 on the two screw-bolts 100 which hold the assembly together. The central movable contact ring 101 of each deck is mounted on a disk 102 of insulating material (see also Figs. 15 and 16) keyed at 103 on the central rotatable operating shaft 104 which is journaled in the end plates 105 and 106 also carried by bolts 100. Operating shaft 104 projects through the cover plate of panel B and carries the operating knob 107 provided with the index pointer 108 adapted to indicate on dial 109 the position to which the switch has been adjusted.

Each deck of the switch (for example deck 2 as shown in Fig. 15) comprises a single stationary contact arm 110 (located at the "off" position of the switch), which has an inner pair of spring contact arms 110' which continuously engage the outer portion of rotatable contact ring 101. At equally spaced circumferential intervals there are eleven other stationary contacts 111, similar to the first described contact 110 with the exception that the spring arms do not project inwardly far enough to engage the contact ring 101. However, there is an outwardly projecting finger 112 on ring 101 which is adapted to successively engage between the contact fingers of the respective fixed contacts 111 as the central rotary contact 101 is moved to its successive positions. In this way a circuit is closed between the wire leading to contact 110, and the selected one of contacts 111 which is engaged by finger 112. In Fig. 15 the several fixed contacts 110 and 111 are indicated by the reference characters 1 to 12 inclusive to correspond with the twelve positions of the switch as indicated in Fig. 2.

In Figs. 14, 15 and 16 the switch is shown, by way of example, in the number three stage or position indicated as "heat set," that is the position in which the knob is adjusted to maintain a constant but selected heat-output. It will be noted from Figs. 2 and 15 that circuit wire $i$ is constantly connected to the main central contact 110 of deck 2 of the switch. When the switch is in the number three position, connection is made from wire $i$ to wire 113, and since a similar connection is desired when the switch is in position 9, the same wire 113 is connected to contact 9. It will also be noted that when the switch is in either of positions 4, 5 or 6, connection should be made with another circuit wire 114, which wire is accordingly connected with each of the fixed contacts 111 at these positions on the switch. When the switch is in any of the other positions (that is in positions 1, 2, 7, 8, 10, 11 and 12) no circuits are to be completed through deck 2 of the switch, and consequently there are no circuit wires connected with the corresponding fixed terminals 111, as is indicated in Figs. 2 and 15. The circuits established through the other decks of the switch will be apparent from the wiring connections indicated in Fig. 2.

In order to yieldably lock the switch in each of its twelve positions, the locking device shown in Figs. 13 and 17 is used. This comprises a spring arm 115, keyed at one end 116 on shaft 104, and carrying at its other end a ball 117 adapted to ride over and snap between the several locking lugs 118 arranged in a circular series on the lower face of end plate 105.

Returning now to Figs. 2 and 3, the alternating current supply mains 119 and 120 extend to the primary of transformer 121. One secondary coil 122 of this transformer is provided with a series of taps from which the appropriate alternating current is taken off for operating the valve-actuating motors A, and the timing motor M (hereinafter described). Another secondary 123 of transformer 121 supplies current to the rectifier 124 which supplies direct current for operating the several bridge circuits and relays hereinafter referred to.

At K and K' (Fig. 2) are indicated the relays for closing the energizing circuit for valve-closing motor 75 and valve-opening motor 76 respectively. The wire $y$ leads from one terminal of transformer secondary 122 to panel terminal 58 and thence to the common terminal 80 of the two valve motors. Wires lead from the other terminals of these motors to panel terminals 56 and 57, and thence through wires $z$ and $z'$ to the fixed terminals of switches 125 and 126 controlled by relays K' and K respectively. Wire $b$ leads from the movable contacts of these two switches to panel terminal 39, and thence to fixed contact 86 of pressure release switch H. Movable contact 85 of switch H is connected to panel terminal 40 and thence through wire $c$ to the other terminal of transformer secondary 122. Consequently, if relay K is energized switch 126 will be closed and a circuit will be completed for energizing the valve-closing motor 75. In the same manner, if relay K' is energized another circuit will be closed energizing the valve-opening motor 76. In the event that an excessive pressure is developed in the generator, movable contact 85 of pressure-release switch H will be moved into engagement with contact 87 of this switch. This will complete a circuit through wire $a$ to terminal 127 of relay K' and thence through wire $z$ to valve-opening motor 76. As already noted this will only occur when an excessive pressure has been reached in the generator, and under all normal circumstances the valve operating motors will be entirely under the control of the two relays K and K'.

The galvanometer relay G (Fig. 2) is of known type and comprises the usual highly sensitive galvanometer coil 128 which swings the indicating needle 129 in one direction or the other as the potential-difference varies across certain terminals of a Wheatstone bridge circuit. In the present system, if the heat-output is too high needle 129 will be swung toward the left so as to be over the movable contact arm of a normally opened switch 130. Similarly, if the heat output is too low, needle 129 will swing toward the right so as to be over a second normally open switch 131. Whenever the relay coil 132 is energized, the needle and switch assembly will be pulled toward one another so that whichever switch the needle is above will be closed. In the event that the system is properly balanced and there is no deflection of needle 129, neither of switches 130 or 131 will be closed. These switches 130 and 131 are located in energizing circuits (hereinafter described) for the valve controlling relays K and K' respectively. Wires $d$ and $e$ lead from the terminals of the sensitive galvanometer coil 128 to the terminals 59 and 60 of the several bridge circuits hereinafter described.

At O, P and Q (Fig. 2) are indicated three similar relays, O being the room temperature bridge relay; P being the minimum heat relay; and Q being the maximum heat relay. When relay O is deenergized (as here shown) switches 132' and 133 will be closed. When the relay O is energized, switches 132' and 133 will be opened, but a second pair of switches 134 and 135 will be closed. Relays P and Q operate in an exactly similar manner, the switches controlled thereby being hereinafter referred to.

At R and S are indicated a pair of similar relays, R being known as the maximum heat lock-out relay, and S as the minimum heat-lock-out relay. The relay R functions to prevent any further opening of the valve whenever the maximum heat output for any certain outside temperature has been exceeded, until the heat output again drops below this permitted maximum (see Fig. 11). Relay S operates in a similar manner to prevent any further closing movement of the valve when the heat output has fallen below the permitted minimum for the prevailing outside temperature.

Under normal conditions, switches 136 and 137 of relay R will be closed, and switches 138 and 139 will be open. Whenever relay coil 140 is energized, switches 136 and 137 will be opened and switches 138 and 139 will be closed. The relay switches will remain in this position until the "buck-out" coil 141 is energized, whereupon the relay switches will return to the normal position first described. The relay S operates in an exactly similar manner.

The timing motor M is energized through a circuit extending from one terminal of transformer secondary 122 through normally closed switch 142, motor M, switch 143, and thence through wire c to the other terminal of the transformer secondary. The switch 142 will normally remain closed except when it is desired to manually break this motor circuit. The switch 143 is operated by the master control switch L, and will be opened to stop the motor M when this switch is moved to the "off" position. In all other positions of the master switch, the switch 143 will remain closed.

The timing motor M acts, through suitable reduction gearing, to rotate the two cams M' and M'' at a predetermined slow speed, for example one revolution per minute. Cam M' is provided with a raised portion 144 adapted to successively close the switches 145, 146 and 147 as the cam rotates, not more than one of these switches being closed at any one time.

Assuming now that the master switch L is in any one of positions 4, 5 or 6, when cam M' closes switch 145 a circuit for energizing relay O is completed as follows: From the positive terminal of rectifier 124 to deck 8 of switch L, to switch 145, to relay O, to deck 7 of switch L and thence to the negative terminal of rectifier 124. When the cam M' is further rotated to close switch 146, a similar circuit energizing relay P will be completed as follows: From deck 8 of switch L to switch 146, to deck 9 of switch L, to relay P, and thence to deck 7 of switch L. When cam M' is further rotated to close switch 147, a circuit energizing relay Q will be completed as follows: To switch 147, to relay Q, and thence back to deck 7 of switch L. It will thus be seen that the relays O, P and Q will be successively energized and deenergized in series as the cam M' rotates.

The second cam M'' is provided with three raised portions 148, spaced 120° apart, so as to close a switch 149 three times each minute, that is once while relay O is energized, once while relay P is energized, and once while relay Q is energized. Each time switch 149 is closed, a circuit energizing relay 132 of galvanometer G will be completed as follows: From the positive terminal or rectifier 124 to deck 8 of switch L, to relay 132, to switch 149, and thence to the negative terminal of rectifier 124.

*Day temperature automatic control*

With master switch L moved to position 6 the apparatus is set for the usual day temperature automatic operation, and this will first be described. Reference will first be made to Fig. 5 (in connection with Figs. 2 and 3), Fig. 5 showing in simplified form the room temperature control bridge circuit. This is a compound bridge made up of three separate branches. (What appears to be a fourth branch shown at the top of Fig. 5 is used to feed in alternating current under certain conditions and will be described hereinafter.) The upper branch of the bridge comprises an arm 150 in which the heat-sensitive winding of room-thermostat D is connected, and an opposite arm 151 in which the compensating loop 92 is connected, together with a fixed resistance 152. The adjacent ends of arms 150 and 151 are connected through the resistances of a pair of potentiometers T and T', and the negative current lead is connected to the junction of the two bridge arms through the moving contact member of one or the other of the potentiometers T and T'. Since the resistance of D varies as a function of the temperature at its location, the arm ratio of this branch of the bridge varies with the room air temperature. The setting of the potentiometer T or T' determines the division of the total resistance of these potentiometers between the two arms of the bridge branch, and consequently determines the temperature at thermostat D required to bring the branch into balance. Therefore these two potentiometers T and T' (which are accessible for adjustment on the face of the panel board, see Fig. 18) provide a means of setting the controller to maintain different room temperatures. The total range of temperature setting adjustment is divided between the two potentiometers T and T'. Potentiometer T provides a range of higher temperature settings suitable for day temperature control, and potentiometer T' provides a range of lower settings suitable for night temperature control.

The arms of a second branch of this bridge contain the equal resistances 153 and 154, the juncture of these arms being through the resistance of a potentiometer U which provides a means of varying the arm ratio in this branch for the purpose of initially balancing the bridge after the apparatus is installed. This is called a bridge centering adjustment, and is utilized to bring the galvanometer needle to the zero point.

The third arm of the bridge comprises the fixed and equal resistances 155 and 156 positioned in opposite arms which are connected at their juncture through the potentiometer J (previously described) which is adjusted by the valve motor A. The arm ratio of this branch is, therefore, a function of the setting of this potentiometer J and consequently of the degree of valve opening. The arm junction of this last named branch of the bridge is connected through an adjustable resistance V to the mid-point of the bridge formed across potentiometer U through the equal fixed resistances 157 and 158. This bridging connection makes possible the coupling of the two branches at the arm junctions without introducing a circulating bridge current through the moving contact of potentiometer U.

The balance of this compound room temperature control bridge is determined by a definite relation between the arm ratios of the three bridge branches. With a given setting of potentiometer T (or T'), and of potentiometer U, a definite relation between the resistance of thermostat D and the setting of potentiometer J must be maintained in order to keep the bridge in balance. The magnitude of the coupling resistance V determines the relative effect of a given change in the setting of J upon the condition of balance or unbalance of the bridge. Thus the setting of resistance V determines the amount of change in the setting of potentiometer J required to balance a given change in temperature at thermostat D, or in other words the amount of temperature change at the thermostat required to produce a given change in the valve opening.

Assuming now that master switch L has been has been set in position 6 for day temperature automatic control, and that switch 145 has been closed by the timing cam M' so as to energize room temperature relay O, direct current connections to the bridge will be completed as follows: From the negative terminal of the rectifier to deck 1 of master switch L, to switch 135 of relay O, to deck 4 of switch L, through wire o to the movable contact of potentiometer T. The connection to the other side of the bridge is from the positive terminal of the rectifier to deck 3 of switch L, through wire r to the movable contact of potentiometer U. This connection continues through potentiometer U, resistances 157 and 158, and resistance V, through wire w to switch 134 of relay O, to deck 5 of switch L, through wire q to the movable contact of potentiometer J.

If the bridge is in proper balance at this time, that is if the room temperature is that for which potentiometer T is set, there will be no movement of the needle 129 of galvanometer G. If the room temperature is too high, needle 129 will swing to the left (Fig. 2). Relay coil 132 will now be energized for a few seconds (its circuit being closed by cam M'' as already described) so that switch 130 will be temporarily closed thus completing an energizing circuit for relay K as follows: From the positive terminal of the rectifier to deck 8 of switch L, to switch 130, to switch 159 of relay P, to switch 160 of minimum heat lock-out relay S, to relay K, and thence back to the negative side of the rectifier. The closing of switch 126 of relay K, will complete the actuating circuit for valve-closing motor 75 so that the valve will be slightly closed, and at the same time potentiometer J will be adjusted in a direction tending to re-balance the bridge.

On the other hand, if the room temperature had been too low at this time, the galvanometer needle 129 would have swung to the right, over switch 131, so that this switch would be closed when relay 132 was energized. This would complete a circuit similar to the one last described but extending from switch 131 to switch 161 of maximum heat relay Q, to switch 137 of maximum heat lock-out relay R, to relay K'. The closing of switch 125 of relay K' completes the energizing circuit for valve opening motor 76 so that the valve would be opened by a small increment, and simultaneously potentiometer J would be adjusted in an opposite direction to tend to re-balance the bridge. Assuming that the maximum heat output permitted for the prevailing outdoor temperature is not exceeded (Fig. 11) or the heat output does not fall below the minimum for that outside temperature, the above described valve adjustments will take place step by step, once each minute until the correct heat output is obtained to maintain the desired room temperature, after which the bridge will be in balance, needle 129 will not be deflected, and no further valve adjustments will be made. The one minute interval between these increments of valve adjustment will provide time for the change in heat supply to take effect before further adjustment is made. The action of the controller in varying the setting of the valve potentiometer J to keep the bridge in balance results in the valve opening being modulated or proportioned in relation to changes in the temperature at the room thermostat D.

Attention is now directed to Fig. 6 which shows the maximum and minimum heat control bridges. The temperature sensitive resistances C' and C'' of the heat-balancer C are connected in opposite arms of one branch of this bridge, the junction of these arms being through a potentiometer X through which the initial or balancing adjustment is made. At the other side of this bridge are the same two branches, connected in parallel, that were previously included in the room temperature-bridge shown in Fig. 5, with the single exception that a different adjustable resistance W is substituted for the adjustable resistance V previously used. This change is made by the room temperature-relay O which is now deenergized so as to open switch 134 (in the circuit of resistance D) and close the switch 132' which completes the circuit through adjustable resistance W. The setting of this adjustable resistance W determines the amount of change in temperature difference of the heat-output coils C' and C'' required to balance the effect of a given change in the setting of the valve potentiometer J.

At the first mentioned side of the bridge, another branch in parallel with the first described branch comprises two arms in one of which is connected the window thermostat resistance F, and in the other of which is connected the balancing loop 97 and a fixed resistance 162 connected in series therewith. The junction of these two arms is made through a pair of similar potentiometers Y and Z connected in parallel, the former being in the minimum temperature bridge and the latter in the maximum temperature bridge. These potentiometers Y and Z are, respectively, for making the minimum and maximum heat intercept cut-off temperature adjustments. In other words, the adjustment of these potentiometers determines the outdoor temperatures as recorded at thermostat F where the minimum and maximum heat lines will intercept the zero heat output line (Fig. 11). These points will vary with the building construction, and general character of the heating installation, and these adjustments will also determine the width of the room temperature control range. In series with the movable contacts of potentiometers Y and Z respectively are the adjustable resistances Y' and Z' for making the minimum and maximum heat temperature ratio adjustments, that is these adjustments determine the slope of the minimum and maximum heat lines respectively, as shown in Fig. 11.

The positive current supply lead to both of the lower branches of both the maximum and minimum bridges has already been referred to and is substantially the same as in the room control bridge shown in Fig. 5. The negative supply lead to the upper branches of the minimum heat control bridge is as follows: From the negative terminal of the rectifier to deck 1 of switch L, to switch 163 of relay P (which is closed when the minimum heat relay is energized), to deck 6 of switch L, through wire j to the movable contact of adjusting resistance Y', and from one end of this resistance to the movable contact of potentiometer Y. Another branch of this circuit extends from the other end of resistance Y' through wire $h$ to switch 164 of maximum heat relay Q (which is closed when this relay is deenergized) to deck 2 of switch L, and through wire $i$ to the movable contact of potentiometer X. This last branch of the circuit connects the two upper bridge branches together at their junctures. The negative lead to the maximum temperature bridge extends from deck 1 of switch L to switch 165 of relay Q (which will be closed when this relay is energized), through wire $g$ to the movable contact of resistance Z'. One end of this resistance is connected to the movable contact of potentiometer Z. The other end of this resistance Z' is connected through wire $f$ to switch 166 of relay Q, to deck 2 of switch L, and thence as before to the central movable contact of potentiometer X.

The positions of the radiator coils C' and C", and the window thermostat coil F in the bridge arms are such that as the temperature at the window coil is reduced, the temperature difference of the radiator coils C' and C" (which indicate the heat output) must increase in order to keep the bridge in balance. By properly adjusting the potentiometers, the amount which the temperature difference of the radiator coils must increase in order to balance the effect of a 1° decrease in the temperature at the window coil can be determined.

We have already described how an increment of adjustment is imparted to valve 15 in response to a reading of the room temperature control bridge (Fig. 5), one of these adjustments taking place once every minute. Now let us assume that one of these adjustments has been completed and the rotation of cam M' (in a counter-clockwise direction Fig. 2) has closed switch 146 so as to energize minimum heat relay P, and has opened switch 145 so as to deenergize room temperature relay O. The circuits through the minimum heat control bridge of Fig. 6 will now be completed, as already described. Normally the rate of heat output will be greater than the minimum required in relation to the weather conditions so that the temperature difference of the radiator coils C' and C" will be greater than that required to balance the bridge for the temperature existing at thermostat F. As a consequence, the bridge will be unbalanced so that galvanometer needle 129 will swing to the left and when relay 132 is energized switch 130 will be closed. However, no valve controlling action results since the already described energizing circuit for relay K is now open at switch 159 of relay P.

On the other hand, if the heat output is below the required minimum for the prevailing weather conditions, galvanometer needle 129 will be swung toward the right so as to close switch 131 when relay 132 is energized. This will complete a circuit extending from the positive terminal of the rectifier through deck 8 of switch L to switch 131 of galvanometer relay G to switch 167 (now closed) of relay P, to switch 168 of relay S, through pull-in coil 169 of this relay, and thence through deck 7 of switch L to the negative side of the rectifier. This will actuate relay S to open switches 160 and 168 and close switches 170 and 171. The closing of switch 170 completes a "hold-in" circuit for relay coil 169, this circuit extending from terminal 172 in the positive lead, adjacent switch 131, through switch 170 and coil 169, to the negative lead as already described. As long as switch 160 of relay S is held open, the energizing circuit for valve closing relay K cannot be closed, so that no succeeding operation of the room temperature control bridge can effect a closing movement of the valve, even though the room-thermostats should indicate a high room temperature.

The same operation of the minimum heat output bridge, in addition to setting the relay S as just described, will cause a valve-opening operation of relay K' by completing the following circuit: From switch 131 through switch 161 of relay Q, to switch 137 of relay R, to relay K', and thence as before to the negative terminal of the converter. This will give a small opening movement to the valve 15, and this opening movement will be repeated every time the minimum heat control bridge is operated until the heat output again rises above the required minimum for the prevailing weather conditions. When the minimum heat output has been reestablished, an operation of the minimum heat output bridge will cause galvanometer needle 129 to swing normally toward the left so that switch 130 will be closed. This will now complete a circuit to reestablish the normal positioning of relay S, the circuit being as follows: From switch 130 through switch 172 of relay P, through switch 171 of relay S, through buck-out coil 173 of relay S, and thence as before to the negative side of the power supply. The energization of coil 173 will return the several switches of relay S to their normal positions, that is switches 170 and 171 will be opened and switches 168 and 160 will be closed.

The operation of the maximum heat output bridge is quite analogous to that of the minimum heat bridge just described. When cam M' has rotated further in a counter-clockwise direction it will close switch 147 and open switch 146, thus energizing the relay Q and deenergizing the relay P. Under normal conditions the heat output will be below the permitted maximum so that needle 129 of the galvanometer will swing to the right and switch 131 will be closed when relay coil 132 is energized. However, no opening movement of the valve will result since the normal energizing circuit of relay K' is now open at the switch 161 (relay Q now being energized). However, if the heat output should be above the permitted maximum needle 129 will swing to the left and switch 130 will be closed. A circuit will now be closed from switch 130 through switch 174 of relay Q, switch 136 of relay R, and pull-in coil 140 of relay R, so as to close switches 139 and 138 of relay R, and open switches 136 and 137. The closing of switch 139 completes a hold-in circuit for coil 140, this circuit extending as before from terminal 172 of galvanometer relay G through switch 139 to coil 140. The opening of switch 137 breaks the normal energizing circuit of valve-opening relay K' so that no further increases in the valve opening can be caused by operation of the room temperature bridge. At the same time a circuit is established from switch 130 through switch 159 of relay P, switch 160 of relay S, and relay K so as to close the valve 15 by a small increment. These closing movements will continue each time the maximum heat control bridge is used (that is once every minute) until the heat output is again lowered below the permitted maximum. When this takes place the next succeeding operation of the maximum temperature bridge will cause switch 131 of the galvanometer relay to be closed thereby completing a circuit from switch 131 through switch 175 of relay Q and switch 138 of relay R so as to energize the buck-out coil 141 of relay R and reestablish the normal positioning of the switches of this relay, as now shown in Fig. 2.

Briefly restating the normal automatic day operation of this system, a small opening or closing adjustment will be given once each minute to valve 15 depending on whether the average inside or room temperature is below or above the desired room temperature for which potentiometer T is set. If the room temperature is correct no adjustment of the valve is made. Between each valve adjustment in response to room temperature readings, the minimum and maximum bridges are separately and successively utilized to find out whether the heat output of the system is above the permitted maximum for the prevailing weather conditions, or outside temperature, or below the required minimum. If the heat output is below the minimum an opening movement is given the valve in response to the minimum bridge reading and no closing movements are permitted regardless of the room temperature readings until the heat output has again been raised above this minimum. In the same manner, if the heat output exceeds the permitted maximum, a closing movement is imparted to the valve and no further opening movements are permitted until the heat output is reduced below the permitted maximum.

*Night automatic temperature control*

For the night control, master switch L is moved to position 5. Substantially the same bridges as are used for "day" control (with the alterations hereinafter noted) are used as shown in Figs. 5 and 6 and described in detail hereinabove, and these bridges are employed in the same order. In the room temperature bridge (Fig. 5) the negative current supply lead now runs from deck 4 of switch L through wire n to potentiometer T' which is set for the lower temperature that is to be maintained at night. Otherwise this control bridge is the same as for day operation and the same control operation takes place. The negative control lead of the minimum temperature bridge (Fig. 6) now runs from contact 5 of deck 6 of switch L to one end of the potentiometer AA in the extra bridge branch shown at the top of Fig. 6, this being the same as the bridge branch shown at the top of Fig. 8 and forming a part of the valve-opening setting bridge hereinafter described in more detail. The use of this alternative arm in the minimum bridge at night serves to depress the minimum heat control to such a point that it will permit the heat output to be reduced practically to zero under any normal weather conditions. In other words, the minimum heat control is substantially eliminated during night operation thus permitting the substantially reduced temperature which is sufficient for night use to be maintained.

*Clock control*

When master switch L is moved to position 4 for clock control, the system is automatically shifted from automatic day control to automatic night control and then back again to automatic day control at certain selected hours. The clock mechanism shown at CC (Fig. 2) rotates the cam 177 once in twenty-four hours, and during the night hours the raised portion 178 of this cam engages and closes a switch 179, thus energizing coil 180 of relay DD through the circuit from contact 4 of deck 8 of switch L, to coil 180, to clock-switch 179, to deck 7 of switch L. As long as switch 179 is open and relay DD is deenergized the usual day operation takes place. At this time the following changes are made in the usual "day" circuits: In place of the lead that formerly extended from contact 6 of deck 6 of switch L direct to resistance Y' of the minimum heat bridge, a new lead is substituted extending from contact 4 of deck 6 through normally closed switch 181 of relay DD to resistance Y'. Also for the lead which formerly extended from contact 6 of deck 4 of switch L direct to the potentiometer T, is now substituted a lead extending from contact 4 of deck 4 through switch 182 of relay DD and thence as before to potentiometer T. Obviously switches 181 and 182 will be opened when relay DD is energized so as to break these two day operation circuits. At the same time switches 183 and 184 of relay DD will be closed. A circuit now extends from contact 4 of deck 4 of switch L through switch 184 of relay DD and thence through wire n to the night setting potentiometer T'. Another circuit extends from contact 4 of deck 6 through switch 183 and wire k to the potentiometer AA so as to depress the minimum heat output bridge as already described.

*Heat output setting control*

In Fig. 7 is shown the bridge used for automatically maintaining a selected constant heat output from the radiating system. This bridge will be connected in service when switch L is moved to position 3 and contains the same valve potentiometer branch through potentiometer J, and the same radiator coil or "heat balancer" branch containing heat sensitive resistances C' and C'', as were used in the maximum and minimum bridges previously described. A third branch of this bridge comprises the arms containing resistances 153 and 154 connected to the ends of a potentiometer EE. The junction of the arms of this branch is connected with the junction of the arms of the valve-potentiometer branch through the equal fixed resistances 157, 158, the adjustable resistance FF, through wire v to contact 3 of deck 5 of switch L, thence through wire q to the central contact 82 of potentiometer J. Potentiometer EE is a centering adjustment for initially balancing the bridge. The adjustable resistance FF provides an independent differential adjustment for this bridge. Another branch of this bridge shown at the top of Fig. 7 comprises the opposite arms containing resistances 185 and 186 respectively and connected to the ends of a potentiometer BB. Connected in parallel with potentiometer BB is an adjustable resistance GG. The movable contact of potentiometer BB is connected through wire m to contact 3 on deck 1 of master switch L, to contact 3 of deck 2, and through wire i to the movable contact of potentiometer X, thus coupling together the last described branch of the bridge and the radiator-coil branch at the junctures of their respective arms. The rate of heat-output required to bring the bridge to balance is determined by the adjustment of potentiometer BB. The setting of the adjustable resistance GG determines the total effective resistance between the terminals of potentiometer BB and thereby provides a range adjustment for the heat-output setting potentiometer BB. The negative current supply lead for this bridge extends from the converter through contact 3 of deck 1 of master switch L through wire $m$ to the movable contact of potentiometer BB. The positive current lead extends through contact 3 of deck 3, through wire $s$ to the movable contact of potentiometer EE.

Now, with the bridge of Fig. 7 thus energized, if the heat output falls below the desired output for which potentiometer BB is set, the galvanometer needle will swing to the right, and conversely if the heat output is above the desired value the needle will swing to the left. Once each minute the depressor relay 132 of the galvanometer G will be energized so as to selectively close either switch 130 or 131 (in accordance with which one the needle is above), the circuit for energizing relay 132 at this time being as follows: From the positive side of the converter to deck 8 of switch L, to contact 3 of deck 9, to switch 146, to relay coil 132, to switch 149, and thence to the negative side of the rectifier. It will be apparent that this circuit will only be closed once a minute, at the time the two cam-operated switches 146 and 149 are simultaneously closed. The closure of switch 130 at the galvanometer will cause a closing operation of motor-operating relay K, and on the other hand a closure of switch 131 will cause an opening movement of the valve through the closing of relay K'. In other words, if the heat output is above the desired value valve 15 will be given a small closing movement, and if the heat output is below the desired value the valve will be slightly opened. These periodic valve movements will continue until the desired heat output is established, at which time the galvanometer needle will remain in a central position and no further valve movements will take place until a departure from this heat output again unbalances the bridge.

*Valve setting control*

If master switch L is set to position 2, the bridge shown in Fig. 8 will be utilized to automatically set the valve opening to a selected position determined by the manual setting of the potentiometer AA. The lower branch of this bridge is the valve-potentiometer J branch as heretofore used. The upper branch of this bridge comprises two arms connected to the terminals of the valve-setting potentiometer AA. The two arms of this branch respectively include the fixed resistances 187 and 188. These two arms also include respectively the two halves of a dual adjustable resistance HH. The windings of this dual resistance are of equal value and the sliding contacts are so arranged that as one resistance is increased the other is reduced. This provides an adjustment for initially balancing the bridge. The setting of the adjustable resistance JJ, connected in parallel with potentiometer AA, determines the effective range of adjustment of the potentiometer.

The positive current supply lead is from the positive side of the rectifier to contact 2 of deck 3 of master switch L to deck 5 of switch L and through wire $q$ to valve-operated potentiometer J. The negative current lead is from the converter to contact 2 of deck 1 of switch L, thence through wire $l$ to the movable contact of potentiometer AA.

The depressor relay coil 132 of galvanometer-relay G will now be energized intermittently (whenever cam operated switch 149 is closed by cam M'') through the following circuit: From the positive side of the converter to deck 8 of switch L, to relay coil 132, to switch 149, to the negative side of the rectifier. The galvanometer needle will swing to one side or the other in accordance with whether the valve-opening at that particular time (as indicated by the valve-potentiometer J) is above or below the desired valve opening for which potentiometer AA has been manually set. If the valve opening is too small switch 131 will be closed to cause a small opening movement of the valve. Conversely, if the valve opening is too large switch 130 will be closed to cause a slight closing movement of the valve. In either case, a corresponding adjustment of potentiometer J will occur. When the desired valve opening has been attained, the bridge will be balanced by the setting of potentiometer J.

*Valve opening indication*

In order to measure the valve opening existing at any given time, the master switch L is moved to position 10. The bridge of Fig. 8 will now be connected in circuit in the same manner as previously described. However, with this setting of control switch L no circuit can be completed for energizing the relay magnet 132, so that the galvanometer is utilized simply as a null point indicator. If potentiometer AA is now adjusted until the galvanometer needle comes to the zero or null point, an indication of the valve opening can be read on the dial of potentiometer AA.

*Heat output indication*

To obtain an indication of the rate of heat output existing at any given time master switch L is moved to position 9, and the bridge shown in Fig. 9 is utilized. The two upper branches of this bridge are the same as the two upper branches shown in Fig. 7 and used in the heat-output control bridge. The lower branch of the bridge shown in Fig. 9 comprises the two arms containing fixed resistances 153 and 154 extending to the end terminals of a potentiometer KK. The positive supply line leads from the positive side of the rectifier through contact 9 of deck 3 of switch L through wire $u$ to the movable contact of potentiometer KK. The negative supply line leads from the rectifier through contact 9 of deck 1 and wire $m$ to the movable contact of potentiometer BB. Another branch of this supply line leads through wire 113 to contact 9 of deck 2 of switch L and thence through wire $i$ to the movable contact of potentiometer X. The potentiometer KK is used as a centering adjustment for this heat output indication bridge.

With the master switch L in position 9, no circuit can be completed for energizing the galvanometer relay 132 so that the galvanometer needle is used simply as a null-point indicator. By adjusting the potentiometer BB until the galvanometer needle is at the zero position, the rate of heat output can be read on the operating dial of potentiometer BB. It may here be noted that in the construction here shown the two potentiometers AA and BB are operated from the same control dial 189, only one of these potentiometers being used at any one time.

*Day or night room temperature indications*

If master switch L is moved to position 7, the bridge shown in Fig. 10 is utilized to measure the room temperature existing at this time. The upper branch of this bridge is the same one as shown in the day temperature control bridge (Fig. 5) and contains the room temperature thermostat or thermostats D. The lower branch of this bridge is similar to the lower branch of the bridge shown in Fig. 9, except that another potentiometer LL is substituted for the potentiometer KK. The positive current supply connection is from the rectifier to contacts 7 or 8 of deck 3 of switch L through wire *p* to the movable contact of potentiometer LL. This potentiometer is used for initially balancing the bridge. The negative current supply runs from the converter to contact 7 of deck 1 of switch L, then though wire *o* to the movable contact of potentiometer T. When master switch L is set to position 8 for night temperature indication, this last mentioned circuit extends from contact 8 of deck 1 through wire *n* to the potentiometer T'. With the master switch in either of positions 7 or 8 no circuit can be completed for energizing the depressor coil 132 of galvanometer G.

With the master switch in position 7, the setting at which potentiometer T is adjusted to bring the galvanometer needle to zero is an indication of the temperature existing at the room thermostat D. In the same manner, with master switch L set at position 8, the position to which potentiometer T' is adjusted to balance the bridge and bring the galvanometer needle to zero is an indication of the temperature existing at the room thermostat D during night operation.

*Manual opening or closing of the valve*

When master switch L is set to position 11, a circuit is completed from the positive terminal of the rectifier through contact 11 of deck 8 of switch L to relay K' and thence directly back to the negative side of the converter. The closing of switch 125 by relay K' will cause motor 76 to run continuously until limit switch 84 is opened, thus completely opening the valve. If master switch L is moved to position 12 a rapid closing of the valve is accomplished in the same manner through a similar circuit through deck 8 of switch L which energizes relay K. Motor 75 will continue to run until the valve is completely closed and limit switch 83 has been opened.

It will be noted (see Fig. 8) that when master switch L has been set in either of positions 11 or 12 for a rapid opening or closing of the valve, the valve indication bridge is connected in circuit the same as in position 10 of switch L so that the valve setting indication feature is available at this time.

At 189' (Fig. 2) is indicated a loading resistor which is connected across decks 1 and 3 of master switch L (and hence across the terminals of the converter or rectifier 124) only when the master switch is in position 1, or the "off" position. This is used simply for the purpose of increasing the life of the rectifier.

It will be noted that in the preferred form of bridge circuits here shown, the current leads are switched instead of the galvanometer leads in order to obtain greater accuracy in the galvanometer readings. Therefore the room bridge (Fig. 5) will be excited only during the time that this bridge is being used for controlling purposes unless current is being fed into it from a different source at other times. There is a certain amount of heating effect due to current flow and alternate flow and cessation of the current would result in the thermometers changing their resistances and consequently giving inaccurate indications or controlling effects. That is, if the current is part of the time left off of the resistances sensitive to room temperature, whenever current flow is restored the elapse of an appreciable time interval would be required before the resistances sensitive to room temperature reached the proper value in response to the existing room temperature. To prevent this possibility and at the same time not upset the direct current excitation of the bridge, an alternating current is fed to the room bridge at times when otherwise there would be no current flowing therein.

At the top of Fig. 5 is indicated another bridge branch including in its respective arms the fixed resistances 190 and 191. The juncture of these bridge arms is connected through wire *x* with one end of the rheostat MM (Fig. 2), the end terminals of this rheostat being connected across the secondary coil 122 of transformer 121. The movable contact of rheostat MM is connected through switch 133 of relay O to deck 4 of master switch L. The direct current to this bridge is supplied through deck 4 when the master switch is in automatic control positions. It will be noted that switch 133 of relay O will be open (so as to break the alternating current circuit) whenever relay O is energized to connect the room temperature bridge in circuit. However, switch 133 will be closed when relay O is deenergized so that alternating current will be fed into this bridge to keep the thermostats heated to the normal operating temperature. The rheostat MM is for adjusting this alternating current to the proper value to maintain this heating effect. It will be noted from deck 4 of switch L that when this switch is in any other position except positions 7 and 8 for day or night temperature indication, alternating current will be fed into this bridge at all times when direct current is not being fed into the bridge for control purposes. This prevents the prolonged interruptions of the direct current flow from upsetting the balance of this bridge.

The normally closed but manually operable switch 142 in the supply circuit to timing motor M provides means for stopping the cycle operation of the switches in any position so that adjustments can be made in any of the bridges while these bridges are energized.

It will be noted from Fig. 18 that the control dials for the master switch L, the day and night temperature setting potentiometers T and T', and the single dial 189 for controlling the heat output potentiometer BB and the valve setting potentiometer AA, are preferably accessible on the face of the panel board. The adjustments of the other potentiometers are of a more or less permanent character and can be made from normally concealed positions in the panel board. A plurality of signal lights are also visible from the front of the panel board. Referring to Figs. 2 and 18, the lights 192, 193 and 194 are respectively connected in shunt with the several relays O, P and Q so as to indicate at any time whether the room temperature control bridge, the minimum temperature control bridge, or the maximum temperature control bridge is in operation. The lights 195 and 196 are respectively connected in parallel with the valve-controlling relays K' and K so as to indicate at any time whether the valve is being closed or opened.

At 197 is indicated another signal light connected in series with a thermostatically operated circuit breaker 198 so that this light will flash on and off or wink. The energizing circuit for this lamp extends from the positive side of rectifier 124 through deck 7 of the master switch and thence back to the negative side of the rectifier. It will be noted that this circuit will be completed whenever the master switch is in any other operating position than 4, 5 or 6. In other words, whenever the system is set for any control other than the usual automatic controls (day, night or clock), the flasher 197 will operate continually as a warning signal.

It will be understood that the thermostat F which measures a resistance change as a function of outside temperature changes, or changes in weather conditions, might be located outside of the building. This would not give as accurate results, since the effects of outside temperature change are always felt within the building as a result of a change in the rate of heat loss through the building walls, and there is a certain time lag before these effects are noticed within the building so as to effect the inside temperature. On the other hand, the thermostat F might be positioned against the inner surface of an outside wall of the building. This would give more accurate results than placing the thermostat outside of the building, but here again the rate of heat loss would not be as accurately timed since the great preponderance of heat loss is usually through the glass of the windows. Therefore the preferable positioning of thermostat F is against the inner surface of one of the outside windows. This placing of thermostat F has several other advantages. The thermostat will respond directly to changes in sunlight, either direct or reflected from opposite buildings. This radiant heat of sunlight has an effect within the building quite apart from the actual prevailing outside temperature. Also changes in the direction and velocity of the wind will change the rate of heat loss through the window, and consequently the temperature at the inner surface of the window against which the thermostat is positioned. Variations in the relative humidity of the air will also affect the moisture film on the window so as to affect the temperature reading of the sensitive resistance F. It will also be noted that the enclosing casing 96 and the inner surface of the window-pane respond to temperature changes of the inside air and the mean radiant temperature of walls, floors and ceiling, all of these temperature changes being transmitted to some extent to the heat-responsive resistance F. There is thus provided a self-compensating adjustment of the maximum and minimum heat supply limits to temporarily increase the permitted heat-output for given outside temperatures to satisfy the increased heat demand during the heating-up period before the desired room temperatures have been established as for example after night operation when the inside temperature has been lowered.

Referring again to the maximum and minimum heat output control (see Figs. 6 and 11), it should be noted that the cut-off temperature adjustments as made by potentiometers Y and Z are quite independent of the "slope" or rate of heat-output adjustments as made by resistances Y' and Z'. This is quite important since it permits an independent selection of the maximum and minimum heat-outputs for any outside temperature as well as an independent selection of the rate of change of heat output at either the maximum or minimum limits for each increment of change in outside temperature. In other words, the control range of inside temperatures can be raised or lowered, and independently the width of the range and the rate of change in width can be adjusted. The system can thus be properly set for any combination of building conditions.

It will be noted that the motor-operated proportioning potentiometer J is located in a branch of all of the automatic control circuits, this resistance being adjusted in accordance with the degree of valve opening and thereby rebalancing the bridges as the valve is adjusted, thus preventing an over-adjustment of the valve opening. This provides for a true modulating or proportioning adjustment of the control valve so that the valve can be accurately positioned to maintain a steady rate of heat output just sufficient to offset the prevailing heat losses. Also timing the valve adjustments and providing a substantial pause between each increment of adjustment so that the adjusted rate of heat output will have an opportunity to take effect within the building before an additional adjustment is made, guards against over-shooting and consequent repeated and unnecessary opening and closing movements of the valve.

We claim:

1. An automatic control apparatus which modulates the degree of opening of a steam flow control valve, comprising a resistance thermostat responsive to variations in the temperature of the air within the enclosure being heated, a resistance thermostat responsive to a function of variations in the outside temperature, a resistance thermostat responsive to variations in the heat output of the heating system, a balanced bridge electrical system embodying said temperature responsive resistances, timing mechanism for alternatively connecting selected resistances in the system and functioning to move the valve in response to an unbalanced condition of the system so that the heat output will be restricted to a range between a predetermined maximum and minimum for each prevailing outside temperature, and the valve will be moved within said range in response to variations from a predetermined inside temperature, and a resistance in the system that is mechanically adjusted in accordance with the valve movement to rebalance the system, and stop the movement of the valve.

2. In an automatic temperature control apparatus which modulates the heat output of a heating system, a balanced bridge electrical circuit consisting of a plurality of parallel branches each comprising a pair of series connected resistance arms, means comprising a galvanometer connected across the bridge for increasing or decreasing the heat output in response to a condition of unbalance of the bridge, one branch of the bridge including a resistance that is mechanically varied proportionate to the changes thus made in heat output so as to restore the balance of the bridge, another branch of the bridge comprising in one arm a heat sensitive resistance that varies its resistance in response to temperature changes at a certain location, a normally compensating resistance in the other arm of this branch, and an adjustable potentiometer at the juncture of these arms for determining the temperature at the heat-sensitive resistance that will balance the bridge.

3. In an automatic temperature control apparatus which modulates the heat output of a heating system, a balanced bridge electrical circuit consisting of a plurality of parallel branches each comprising a pair of series connected resistance arms, means comprising a galvanometer connected across the bridge for increasing or decreasing the heat output in response to a condition of unbalance of the bridge, one branch of the bridge including a heat responsive resistance acting to unbalance the bridge in response to temperature changes at a selected location, another branch of the bridge including a resistance that is mechanically varied proportionate to the changes made in heat output so as to restore the balance of the bridge, another branch of the bridge comprising a pair of equal heat-sensitive resistances, one in each arm of the branch, these resistances being positioned in the path of an air flow respectively before and after this air flow has been heated by the system, whereby the resistance differential between these two resistances will measure the heat output, and electrical connections including an adjustable potentiometer between the junctures of the arms of the first and last mentioned branches.

4. In an automatic temperature control apparatus which modulates the heat output of a heating system, a balanced bridge electrical circuit consisting of a plurality of parallel branches each comprising a pair of series connected resistance arms, means in a branch of the bridge for unbalancing the system in response to temperature variations in the space being heated, means comprising a galvanometer connected across the bridge for increasing or decreasing the heat output in response to a condition of unbalance of the bridge, one branch of the bridge including a resistance that is mechanically varied proportionate to the changes thus made in heat output so as to restore the balance of the bridge, another branch of the bridge comprising a pair of equal heat-sensitive resistances, one in each arm of the branch, these resistances being positioned in the path of an air flow respectively before and after this air flow has been heated by the system, whereby the resistance differential between these two resistances will measure the heat output, another branch of the bridge comprising in one arm a heat-sensitive resistance so positioned as to vary its resistance as a function of outside temperature changes, a normally compensating resistance in the other arm of this branch, alternative electrical connections between the junctures of the arms of said two last-mentioned bridge branches including adjustable resistances for selectively determining the maximum and minimum heat outputs permitted for each outside temperature, and timing mechanism for separately and successively connecting said first-mentioned branch and each of said maximum and minimum bridge combinations in the bridge.

5. In an automatic temperature control apparatus which modulates the heat output of a heating system, a balanced bridge electrical circuit consisting of a plurality of parallel branches each comprising a pair of series connected resistance arms, means comprising a galvanometer connected across the bridge for increasing or decreasing the heat output in response to a condition of unbalance of the bridge, one branch of the bridge including a resistance that is mechanically varied proportionate to the changes thus made in heat output so as to restore the balance of the bridge, another branch of the bridge comprising a pair of equal heat-sensitive resistances, one in each arm of the branch, these resistances being positioned in the path of an air flow respectively before and after this air flow has been heated by the system, whereby the resistance differential between these two resistances will measure the heat output, another branch of the bridge comprising in one arm a heat-sensitive resistance so positioned adjacent the inner surface of a window as to vary its resistance as a function of outside temperature changes, a normally compensating resistance in the other arm of this branch, and alternative electrical connections between the junctures of the arms of said two last-mentioned bridge branches including adjustable resistances for selectively determining the maximum and minimum heat outputs permitted for each outside temperature, and timing mechanism for separately and successively connecting said first-mentioned branch and each of said maximum and minimum bridge combinations in the bridge.

6. An automatic temperature control apparatus which modulates the heat output of a heating system, comprising thermostatic means responsive to variations in temperature of the air within the enclosure being heated, thermostatic means responsive to a function of variations in outside temperature, thermostatic means responsive to variations in the heat output from the system, and an electrical control system embodying said several thermostatic means and timing mechanism for successively and by small increments increasing the heat output when this output falls below a predetermined minimum for the outside temperature then prevailing, decreasing the heat output when this output rises above a predetermined maximum for the outside temperature then prevailing, and either decreasing the heat output when the temperature within the enclosure rises above a predetermined inside temperature except when the output is below the predetermined minimum, or increasing the heat output when the inside temperature is below the predetermined inside temperature except when the output is above the predetermined maximum.

7. An automatic temperature control apparatus which modulates the degree of opening of a steam flow control valve, comprising thermostatic means responsive to variations in the temperature of the air within the enclosure being heated, thermostatic means responsive to a function of variations in outside temperature, thermostatic means responsive to variations in the heat output from the heating system, and an electrical control system embodying said thermostatic means and timing mechanism for successively and by small increments moving the valve toward open position when the heat output falls below a predetermined minimum for the outside temperature then prevailing, toward closed position when the heat output rises above a predetermined maximum for the outside temperature then prevailing, and either toward closed position when the temperature within the enclosure rises above a predetermined inside temperature except when the heat output is below the predetermined minimum, or toward open position when the inside temperature is below the predetermined inside temperature except when the heat output is above the predetermined maximum.

8. An automatic temperature control apparatus which modulates the degree of opening of a steam flow control valve, comprising reversible electrically operated means for moving the valve in either direction, a galvanometer-relay comprising a swinging member and means for actuating the valve-operating means in one direction or the other as the swinging member moves to one side or the other of its central neutral position, a balanced-bridge control circuit including a plurality of parallel branches each comprising a pair of series connected resistance arms, the galvanometer being connected across the bridge so that the swinging member will move from its neutral position as the bridge is unbalanced, an adjustable resistance in one branch of the bridge actuated by the valve-operating means to rebalance the bridge as the valve is adjusted, and a pair of thermostats connected in the respective arms of another branch of the bridge and each comprising a heat sensitive resistance element that varies its resistance in response to small changes in the temperature of the surrounding medium, these thermostats being positioned in the path of the air flow over a heat-exchanger in the heating system, one in advance of and the other beyond the heat-exchanger so that the resistance differential between the two elements will vary with changes in the heat output.

9. An automatic temperature control apparatus which modulates the degree of opening of a steam flow control valve, comprising reversible electrically operated means for moving the valve in either direction, a galvanometer-relay comprising a swinging member and means for actuating the valve-operating means in one direction or the other as the swinging member moves to one side or the other of its central neutral position, a balanced-bridge control circuit including a plurality of parallel branches each comprising a pair of series connected resistance arms, the galvanometer being connected across the bridge so that the swinging member will move from its neutral position as the bridge is unbalanced, an adjustable resistance in one branch of the bridge actuated by the valve-operating means to rebalance the bridge as the valve is adjusted, a pair of thermostats connected in the respective arms of one branch of the bridge and each comprising a heat sensitive resistance element that varies its resistance in response to small changes in the temperature of the surrounding medium, these thermostats being positioned in the path of the air flow over a heat-exchanger in the heating system, one in advance of and the other beyond the heat-exchanger so that the resistance differential between the two elements will vary with changes in the heat output, and another temperature-responsive resistance element positioned to respond to temperature changes induced by variations in outside temperature, said latter resistance element being adapted for connection in alternative branches of the bridge, and means for alternatively and periodically connecting said branches in the bridge, so that the valve will be moved only toward a closed position when a predetermined maximum heat output for the prevailing outside temperature is exceeded, and only toward an open position when the heat output falls below a predetermined minimum for the prevailing outside temperature.

10. An automatic temperature control apparatus which modulates the degree of opening of a steam flow control-valve, comprising reversible electrically operated means for moving the valve in either direction, a galvanometer-relay comprising a swinging member and means for actuating the valve-operating means in one direction or the other as the swinging member moves to one side or the other of its central neutral position, a balanced-bridge control circuit including a plurality of parallel branches each comprising a pair of series connected resistance arms, the galvanometer being connected across the bridge so that the swinging member will move from its neutral position as the bridge is unbalanced, an adjustable resistance in one branch of the bridge actuated by the valve-operating means to rebalance the bridge as the valve is adjusted, a pair of thermostats connected in the respective arms of one branch of the bridge and each comprising a heat sensitive resistance element that varies its resistance in response to small changes in the temperature of the surrounding medium, these thermostats being positioned in the path of the air flow over a heat-exchanger in the heating system, one in advance of and the other beyond the heat-exchanger so that the resistance differential between the two elements will vary with changes in the heat output, another temperature-responsive resistance element positioned to respond to temperature changes induced by variations in outside temperature, said latter resistance element being adapted for connection in alternative branches of the bridge, another resistance element positioned to respond to changes in room temperature and connected in another branch of the bridge, and means for periodically and successively connecting said branches in the bridge, so that the valve will be moved only toward a closed position when a predetermined maximum heat output for the prevailing outside temperature is exceeded, and only toward an open position when the heat output falls below a predetermined minimum for the prevailing outside temperature, but will be moved toward either a closed or open position as the room temperature rises or falls as long as the heat output remains within the range between the predetermined maximum and minimum.

11. An automatic temperature control apparatus which modulates the rate of heat output from a heating system, comprising a balanced bridge control circuit consisting of a plurality of parallel branches each comprising a pair of series connected resistance arms, means comprising a galvanometer connected across the bridge for periodically increasing or decreasing the heat output in response to an unbalanced condition of the bridge, heat sensitive resistances in respective bridge branches being variable in response to changes in indoor temperature, in response to a function of outdoor temperature changes, and in response to changes in the rate of heat output from the heating system, and means for periodically and successively operatively connecting different combinations of branches in the bridge to maintain the heat output between predetermined maximum and minimum limits for each outdoor temperature, and within these limits to raise or lower the heat output in response to a fall or rise in inside temperature.

12. An automatic temperature control apparatus which modulates the rate of heat output from a heating system, comprising a balanced bridge control circuit consisting of a plurality of parallel branches each comprising a pair of series connected resistance arms, means comprising a galvanometer connected across the bridge for periodically increasing or decreasing the heat output in response to an unbalanced condition of the bridge, a resistance in one of the branches of the bridge being mechanically varied by the means for adjusting the heat output to restore the balance of the bridge, heat sensitive resistances in certain of the bridge arms variable in response to changes in temperature at selected localities, and means for periodically and successively operatively connecting different combinations of branches in the bridge.

13. An automatic temperature control apparatus which modulates the rate of heat output from a heating system, comprising a balanced bridge control circuit consisting of a plurality of parallel branches each comprising a pair of series connected resistance arms, means comprising a galvanometer connected across the bridge for periodically increasing or decreasing the heat output in response to an unbalanced condition of the bridge, a resistance in one of the branches of the bridge being mechanically varied by the means for adjusting the heat output to restore the balance of the bridge, heat sensitive resistances in respective bridge branches being variable in response to changes in indoor temperature, in response to a function of outdoor temperature changes, and in response to changes in the rate of heat output from the heating system, and means for periodically and successively operatively connecting different combinations of branches in the bridge to maintain the heat output between predetermined maximum and minimum limits for each outdoor temperature, and within these limits to raise or lower the heat output in response to a fall or rise in inside temperature.

14. An automatic temperature control apparatus which modulates the rate of heat output from a heating system, comprising a balanced bridge control circuit consisting of a plurality of parallel branches each comprising a pair of series connected resistance arms, means comprising a galvanometer connected across the bridge for periodically increasing or decreasing the heat output in response to an unbalanced condition of the bridge, a resistance in one of the branches of the bridge being mechanically varied by the means for adjusting the heat output to restore the balance of the bridge, a resistance thermometer in one of the arms of a branch responsive to temperature changes at a predetermined location, a pair of adjustable resistances in the bridge, one determining the inside temperature to be maintained during the day and the other the temperature to be maintained at night, and clock-operated mechanism for automatically directing the operating circuits through one or the other of these adjustable resistances.

15. An automatic temperature control apparatus which modulates the rate of heat output from a heating system, comprising a balanced bridge control circuit consisting of a plurality of parallel branches each comprising a pair of series connected resistance arms, means comprising a galvanometer connected across the bridge for periodically increasing or decreasing the heat output in response to an unbalanced condition of the bridge, a resistance in one of the branches of the bridge being mechanically varied by the means for adjusting the heat output to restore the balance of the bridge, heat sensitive resistances in respective bridge branches being variable in response to changes in indoor temperature, in response to a function of outdoor temperature changes, and in response to changes in the rate of heat output from the heating system, and means for periodically and successively operatively connecting different combinations of branches in the bridge to maintain the heat output between predetermined maximum and minimum limits for each outdoor temperature, and within these limits to raise or lower the output in response to a fall or rise in inside temperature, a pair of adjustable resistances in the bridge, one determining the inside temperature to be maintained during the day and the other the temperature to be maintained at night, and clock-operated mechanism for automatically directing the operating circuits through one or the other of these adjustable resistances.

16. An automatic temperature control apparatus which modulates the rate of heat output of a heating system, comprising a balanced bridge circuit consisting of a plurality of parallel branches each comprising a pair of series connected resistance arms, means comprising a galvanometer connected across the bridge for increasing or decreasing the heat output in response to a condition of unbalance of the bridge, one side of the bridge comprising a pair of branches connected in parallel, and an adjusting resistance shunted across the junctures of the arms of these branches, and a heat sensitive resistance in one of the bridge arms that is variable in response to temperature changes at a selected location.

17. An automatic temperature control apparatus which modulates the rate of heat output of a heating system, comprising a balanced bridge circuit consisting of a plurality of parallel branches each comprising a pair of series connected resistance arms, means comprising a galvanometer connected across the bridge for increasing or decreasing the heat output in response to a condition of unbalance of the bridge, one side of the bridge comprising a pair of branches connected in parallel, and an adjusting resistance shunted across the junctures of the arms of these branches, one branch of the bridge containing a resistance that is mechanically varied by the heat output adjusting means proportionate to the changes made in heat output so as to restore the balance of the bridge.

18. An automatic temperature control apparatus which modulates the rate of heat output of a heating system, comprising a balanced bridge circuit consisting of a plurality of parallel branches each comprising a pair of series connected resistance arms, means comprising a galvanometer connected across the bridge for increasing or decreasing the heat output in response to a condition of unbalance of the bridge, one side of the bridge comprising a pair of branches connected in parallel, an adjusting resistance shunted across the junctures of the arms of these branches, and a heat sensitive resistance in one of the bridge arms that is variable in response to temperature changes at a selected location, one branch of the bridge containing a resistance that is mechanically varied by the heat output adjusting means proportionate to the changes made in heat output so as to restore the balance of the bridge.

19. An automatic temperature control apparatus which modulates the rate of heat output of a heating system, comprising a balanced bridge circuit consisting of a plurality of parallel branches each comprising a pair of series connected resistance arms, means comprising a galvanometer connected across the bridge for increasing or decreasing the heat output in response to a condition of unbalance of the bridge, each side of the bridge comprising a pair of branches connected in parallel, and adjusting resistances shunted between the junctures of the arms of these branches, a resistance in one branch of one side of the bridge that is mechanically varied by the heat output adjusting means proportionate to the changes made in heat output so as to restore the balance of the bridge, and heat sensitive resistances that vary in response to temperature changes at different locations positioned in the respective branches at the other side of the bridge.

20. An automatic temperature control apparatus which modulates the rate of heat output of a heating system, comprising a balanced bridge circuit consisting of a plurality of parallel branches each comprising a pair of series connected resistance arms, means comprising a galvanometer connected across the bridge for increasing or decreasing the heat output in response to a condition of unbalance of the bridge, each side of the bridge comprising a pair of branches connected in parallel, and adjusting resistances shunted between the junctures of the arms of these branches, a resistance in one branch of one side of the bridge that is mechanically varied by the heat output adjusting means proportionate to the changes made in heat output so as to restore the balance of the bridge, a heat sensitive resistance in one branch at the other side of the bridge that varies as a function of changes in outside temperature, and heat sensitive resistances in the respective arms of the other branch at this latter side of the bridge which vary in response to changes in the heat output to the enclosure being heated.

21. An electrical temperature control apparatus of the Wheatstone-bridge type comprising a plurality of bridge branches connected in parallel, each branch consisting of a pair of series connected arms, means comprising a galvanometer connected across the bridge for increasing or decreasing the heat output in response to an unbalanced condition of the bridge, a heat sensitive resistance in one branch of the bridge that changes its resistance as a function of changes in outside temperature, a pair of similar heat-sensitive resistances in the respective arms of another branch of the bridge that change their resistance differential in response to variations in the rate of heat output of the heating system, these two branches being electrically connected at the junctures of their arms, and an adjustable resistance in this electrical connection for selecting the proper rate of change in heat output for each unit change of outside temperature, and a resistance in another branch of the bridge that is mechanically varied by the heat-output adjusting means to restore the balance of the bridge.

22. An electrical temperature control apparatus of the Wheatstone-bridge type comprising a plurality of bridge branches connected in parallel, each branch consisting of a pair of series connected arms, means comprising a galvanometer connected across the bridge for increasing or decreasing the heat output in response to an unbalanced condition of the bridge, a heat sensitive resistance in one branch of the bridge that changes its resistance as a function of changes in outside temperature, a pair of similar heat-sensitive resistances in the respective arms of another branch of the bridge that change their resistance differential in response to variations in the rate of heat output of the heating system, these two branches being electrically connected at the junctures of their arms, and an adjustable resistance in this electrical connection for selecting the proper heat output for each outside temperature, and a resistance in another branch of the bridge that is mechanically varied by the heat-output adjusting means to restore the balance of the bridge.

23. An electrical temperature control apparatus of the Wheatstone-bridge type comprising a plurality of bridge branches connected in parallel, each branch consisting of a pair of series connected arms, means comprising a galvanometer connected across the bridge for increasing or decreasing the heat output in response to an unbalanced condition of the bridge, a heat sensitive resistance in one branch of the bridge that changes its resistance as a function of changes in outside temperature, a pair of similar heat-sensitive resistances in the respective arms of another branch of the bridge that change their resistance differential in response to variations in the rate of heat output of the heating system, these two branches being electrically connected at the junctures of their arms, and a pair of adjustable resistances in this electrical connection that will respectively select the heat output for each outside temperature and the amount of change in heat output for each unit change of outside temperature, and a resistance in another branch of the bridge that is mechanically varied by the heat-output adjusting means to restore the balance of the bridge.

24. An electrical temperature control apparatus of the Wheatstone-bridge type comprising a plurality of bridge branches connected in parallel, each branch consisting of a pair of series connected arms, means comprising a galvanometer connected across the bridge for increasing or decreasing the heat output in response to an unbalanced condition of the bridge, a heat sensitive resistance in one branch of the bridge that changes its resistance as a function of changes in outside temperature, a pair of similar heat-sensitive resistances in the respective arms of another branch of the bridge that change their resistance differential in response to variations in the rate of heat output of the heating system, these two branches being electrically connected at the junctures of their arms, a resistance in another branch of the bridge that is mechanically varied by the heat-output adjusting means to restore the balance of the bridge, and an adjustable resistance in the bridge that will determine the amount of change in heat output required to balance a given adjustment of the mechanically adjusted resistance to keep the bridge in balance.

25. In an automatic temperature control apparatus which modulates the degree of opening of a steam flow control valve, a balanced bridge circuit comprising a plurality of parallel branches each comprising a pair of series connected resistance arms, means for moving the valve toward either open or closed position in response to an unbalanced condition of the bridge, said means comprising a galvanometer connected across the bridge and a relay controlled by the galvanometer, a calibrated manually adjustable resistance in one of the branches for unbalancing the bridge to adjust the valve to a predetermined opening, an adjustable resistance in another branch that is adjusted with the valve-moving means to rebalance the bridge, and means for temporarily rendering the relay inoperative so that by adjusting the calibrated resistance to bring the galvanometer to the null point the existing valve opening can be measured.

26. An automatic temperature control apparatus which modulates the heat output of a heating system, comprising a balanced bridge electrical system including a plurality of branches, means for periodically and alternatively connecting selected groups of bridge branches in the bridge, means for feeding direct current to the bridge branches in use at any one time, a heat-sensitive resistance in one of the branches for measuring temperature variations at a certain location, and means for separately feeding alternating current through said resistance to maintain the normal temperature of the resistance only at the times when said heat-sensitive resistance is not in use.

27. An automatic temperature control apparatus which modulates the heat output of a heating system, comprising a balanced bridge electrical system including a plurality of branches, means for periodically and alternatively connecting selected groups of bridge branches in the bridge, means for feeding direct current to the bridge branches in use at any one time, a heat-sensitive resistance in one of the branches for measuring temperature variations at a certain location, and means for separately electrically heating said resistance to maintain its normal temperature at the times when this resistance is not in use.

28. In an automatic temperature control apparatus, means comprising a balanced bridge system for maintaining the heat output to an enclosure between maximum and minimum limits for each prevailing outside temperature, and manually set means for independently selecting the maximum and minimum limits of heat output for each outside temperature.

29. In an automatic temperature control apparatus, means comprising a balanced bridge system for maintaining the heat output to an enclosure between maximum and minimum limits for each prevailing outside temperature, and manually set means for independently selecting the rate of change of heat output for each increment of change in outside temperature at the maximum and minimum limits of heat output.

30. In an automatic temperature control apparatus, means comprising a balanced bridge system for maintaining the heat output to an enclosure between maximum and minimum limits for each prevailing outside temperature, manually set means for independently selecting the maximum and minimum limits of heat-output for each outside temperature, and other manually set means for independently selecting the rate of change of heat output for each increment of change in outside temperature at the maximum and minimum limits.

31. In an automatic temperature control apparatus for modulating the degree of opening of a steam flow control valve, said apparatus comprising a main control panel, a balanced bridge control system including a plurality of branches and means operable from the panel for alternatively selecting combinations of these branches to effect through said bridge various different functions, one of which is the automatic control of the valve position, a flasher-light, and means for causing said light to operate whenever the system is being utilized for any purpose other than an automatic temperature control.

32. An automatic control apparatus which modulates the heat output of a heating system, comprising a balanced bridge electrical system including a plurality of parallel branches each formed of two series connected resistance arms, means comprising a galvanometer-relay connected across the junctures of the several branches, means controlled by the relay functioning to increase or decrease the heat output of the heating system in response to an unbalanced condition of the bridge, a source of power connected across the junctures of the arms at the two sides of the bridge, a resistance thermostat responsive to variations in the temperature of the air at a selected location within the enclosure being heated and connected in a bridge arm at one side of the bridge, and a balancing resistance joining the adjacent ends of the arms of a branch at the other side of the bridge, said balancing resistance comprising a movable contact dividing this resistance between the two arms, the power connection for this bridge branch leading to the movable contact, the heat output adjusting means also functioning to adjust the movable contact to rebalance the bridge.

33. An automatic control apparatus which modulates the degree of opening of a steam flow control valve, comprising a balanced bridge electrical system including a plurality of parallel branches each formed of two series connected resistance arms, means comprising a galvanometer-relay connected across the junctures of the several branches, means controlled by the relay functioning to move the valve to increase or decrease the heat output of the heating system in response to an unbalanced condition of the bridge, a source of power connected across the junctures of the arms at the two sides of the bridge, a resistance thermostat responsive to variations in the temperature of the air at a selected location within the enclosure being heated and connected in a bridge arm at one side of the bridge and a balancing resistance joining the adjacent ends of the arms of a branch at the other side of the bridge, said balancing resistance comprising a movable contact dividing this resistance between the two arms, the power connection for this bridge branch leading to the movable contact, the valve operating means also functioning to adjust the movable contact to rebalance the bridge.

34. An automatic control apparatus which modulates the heat output of a heating system, comprising a balanced bridge electrical system including a plurality of parallel branches each formed of two series connected resistance arms, means comprising a galvanometer-relay connected across the junctures of the several branches, means controlled by the relay functioning to increase or decrease the heat output of the heating system in response to an unbalanced condition of the bridge, a source of power connected across the junctures of the arms at the two sides of the bridge, a resistance thermostat responsive to variations in the temperature of the air at a selected location within the enclosure being heated and connected in a bridge arm at one side of the bridge, resistance thermostats respectively responsive to a function of variations in the outside temperature and to variations in the heat output of the heating system, said last mentioned thermostats being connected in simultaneously energized and electrically connected branches at the same side of the bridge, timing mechanism for alternatively and successively connecting selected branches in the bridge, and a balancing resistance joining the adjacent ends of the arms of a branch at the other side of the bridge, said balancing resistance comprising a movable contact dividing this resistance between the two arms, the power connection for this bridge branch leading to the movable contact, the heat output adjusting means also functioning to adjust the movable contact to rebalance the bridge.

35. The combination with means for heating a space subject to a variable heat loss, and for regulating the rate of heat input to said space, of, first measuring and control means responsive to the temperature of said space to control said regulating means, second and third measuring and control means, each responsive to the rate of heat input to said space and also to a condition on which the rate of heat loss from the space is at least partially dependent, said second measuring and control means being operable to impose a maximum limit upon the rate of heat input to said space by responding to a rate of heat input in excess of said maximum limit to operate said regulating means to reduce said rate of heat input, said third measuring and control means being operable to maintain the rate of heat input above a minimum limit by responding to a rate of heat input below said minimum limit to control said regulating means to increase the rate of heat input to said space, each of said second and third measuring and control means being operable when controlling said regulating means for disabling the other and for maintaining said other disabled until rate of heat input has returned to a value within said minimum and maximum limits.

36. The combination with a heat exchange system for a space subject to an uncontrolled and variable heat loss or gain, means for effecting a controlled heat transfer for compensating said loss or gain, and means for regulating the rate of said heat transfer to said space, of, first measuring and control means responsive to the temperature of said space for controlling the regulating means, arresting means responsive to an operation of said regulating means for arresting further operation thereof in the same direction, and second measuring and control means constituting a disabling limit control responsive to a condition on which the rate of said uncontrolled and variable heat loss or gain is at least partially dependent, for establishing a limit for the regulation of said rate of controlled heat transfer by said first measuring and control means, which limit varies automatically with the measured value of said condition, said second measuring and control means being responsive at the same time to the rate of said controlled heat transfer, and operating in response to its simultaneous measurement of said rate of controlled heat transfer and said condition, to prevent a variation of said rate of controlled heat transfer beyond said variable limit regardless of space temperature.

37. The combination with a heat exchange system for a space subject to a variable and uncontrolled heat exchange, means for effecting a controlled heat transfer for compensating said uncontrolled heat exchange, and means for regulating the rate of said controlled heat transfer, of, first measuring and control means responsive to the temperature of said space for controlling said regulating means, second measuring and control means responsive to a condition on which the rate of said uncontrolled heat exchange is at least partially dependent, for setting a minimum limit for said controlled heat transfer, which minimum limit varies automatically with the measured value of said condition, said second measuring and control means being operable in response to said measurement and comparison of said two values, to control said regulating means for maintaining said rate of controlled heat transfer above said minimum limit regardless of space temperature, and arresting means responsive to each operation of said regulating means tending to arrest further operation of said regulating means in the same direction.

38. The combination with means for heating a space subject to a variable heat loss, and for regulating the rate of controlled heat input to said space, of, first measuring means responsive to the temperature of said space, first control means responsive to said first measuring means for controlling said regulating means in accordance with said measured space temperature, second measuring means responsive simultaneously to the opposed effects of (1) said rate of controlled heat input to said space, and (2) a temperature condition upon which said rate of variable heat loss from said space is at least partially dependent, whereby to measure the difference between said effects, second control means responsive to said second measuring means and controlling said regulating means for imposing maximum and minimum limits on said difference of said opposed effects by preventing said regulating means from changing said rate of heat input in the direction that carries said difference farther beyond said limits whenever said difference already exceeds said limits, said second control means being further operable to control said rate of heat input, regardless of space temperature whenever said difference of said opposed effects goes outside of said limits, for returning it to a value within those limits, whereby said second control means, regardless of space temperature, responds to said second measuring means for imposing maximum and minimum limits upon said rate of heat input, which limits vary automatically with said temperature condition, and arresting means responsive to each operation of said regulating means for acting upon said first and second measuring means to oppose the effect on said measuring means of each change in the quantity or condition measured thereby, whereby to arrest further operation of said regulating means in the same direction.

39. The combination with means for heating the rooms of a building, and means for regulating the rate of heat input to said rooms, of, a first electric bridge circuit including an electrically responsive temperature sensitive element exposed to room air temperature so as to respond thereto, first control means including a galvanometer responsive to an unbalanced condition of said bridge circuit for controlling said regulating means, second measuring means including a second bridge circuit, said second bridge circuit having a temperature sensitive element responsive at least in part to out-door temperature, and containing also means electrically responsive to the rate of heat input to the rooms, second control means including said galvanometer and responsive to said second bridge circuit for establishing upper and lower limits of rate of heat input which limits vary automatically with changes in outdoor temperature, said second control means responding to said second measuring means for disabling said first measuring and control means for thereby preventing a further variation of said rate of heat input beyond said limits regardless of room temperature whenever said difference already exceeds said limits, said second control means further responding to said second measuring means whenever said rate of heat input lies outside said limits for controlling said regulating means to bring said rate of heat input back within said limits regardless of room temperature, whereby said second measuring and control means impose maximum and minimum limits upon the rate-of-heat-input to the room but within those limits permit said first measuring and control means to control said rate of heat input in accordance with room-air-temperature, and rebalancing means for both said bridge circuits responsive to operations of said regulating means, said rebalancing means including electrical apparatus connected in said bridge circuits and operable whenever either said first or second control means operates the regulating means.

40. In combination in an electrical measuring system, a bridge circuit comprising at least two main bridge branches connected substantially in parallel, a condition responsive current controlling element in one of said main bridge branches, said main bridge branches having coupling points intermediate the ends thereof, two impedance coupling branches, each connected between a coupling point of said one main bridge branch and a coupling point of another main bridge branch, each coupling branch having a terminal point intermediate the points of its connection to its two main bridge branches, circuit connections to the terminal points of said coupling branches, means in one of said coupling branches operable for varying the relative values of impedance of its two portions between its terminal point and its two points of connection to its two main bridge branches, and a switch in said one coupling branch for opening the circuit therethrough between the two main bridge branches to which it is connected.

41. In combination in an electrical measuring system, a bridge circuit comprising two main bridge branches connected substantially in parallel, a condition responsive current controlling element in one of said main bridge branches, said main bridge branches having coupling points intermediate the ends thereof, two impedance coupling branches each connected between coupling points of said two bridge branches, each coupling branch having a separate terminal point intermediate the points of its connection to the coupling points of said two main branches, and terminal connections to the terminal points of said coupling branches.

DAVID N. CROSTHWAIT, Jr.
EVERETT W. WERTS.